US009660567B2

United States Patent
Goehringer et al.

(10) Patent No.: US 9,660,567 B2
(45) Date of Patent: May 23, 2017

(54) SYSTEM FOR MOUNTING AND SUPPORTING PHOTOVOLTAIC MODULES

(75) Inventors: Rainer Goehringer, Kelkheim (DE); Maciej Polewczyk, Aschaffenburg (DE); Arnd Pietrzak, Berlin (DE); Laura Sendra-Gonzalez, Offenbach am Main (DE)

(73) Assignee: Magna International Inc., Aurora, Ontario (CA)

( * ) Notice: Subject to any disclaimer, the term of this patent is extended or adjusted under 35 U.S.C. 154(b) by 308 days.

(21) Appl. No.: 14/357,681

(22) PCT Filed: Mar. 27, 2012

(86) PCT No.: PCT/CA2012/000299
§ 371 (c)(1),
(2), (4) Date: Oct. 23, 2014

(87) PCT Pub. No.: WO2013/078533
PCT Pub. Date: Jun. 6, 2013

(65) Prior Publication Data
US 2015/0311854 A1   Oct. 29, 2015

Related U.S. Application Data

(60) Provisional application No. 61/564,580, filed on Nov. 29, 2011, provisional application No. 61/579,767, filed on Dec. 23, 2011.

(51) Int. Cl.
*E04C 3/02*   (2006.01)
*H02S 20/00*   (2014.01)
(Continued)

(52) U.S. Cl.
CPC ............. *H02S 20/00* (2013.01); *F16M 11/00* (2013.01); *F16M 13/02* (2013.01); *F24J 2/5203* (2013.01);
(Continued)

(58) Field of Classification Search
CPC ........ H01L 31/042; H01L 31/048; F16B 5/00; F16B 2/20; F16D 1/12; F24J 2/5266;
(Continued)

(56) References Cited

U.S. PATENT DOCUMENTS 2,125,692 A * 8/1938 Ragsdale .................. E04C 3/07
105/416
8,595,997 B2 * 12/2013 Wu ......................... F24J 2/5205
136/244
(Continued)

FOREIGN PATENT DOCUMENTS

DE   202005001469 U1   4/2005
DE   102008057012 A1   7/2010
(Continued)

OTHER PUBLICATIONS

European Search Report mailed Feb. 22, 2016.

*Primary Examiner* — Phi A
(74) *Attorney, Agent, or Firm* — Dickinson Wright PLLC

(57) ABSTRACT

A system for mounting and supporting photovoltaic (PV) modules includes a frame rail that is formed with a longitudinally extending channel for retaining a plurality of mounting clips, and mounting clamps for anchoring the frame rail to a support base or support structure. Each mounting clamp includes a pair of jaws for engaging along a base portion of the fame rail. The mounting clips are arranged along the length of the frame rail, and are used to support the PV modules adjacent to the frame rails. Module clamps are used to hold the PV modules in place, the module clamps being secured to the mounting clips using elongated fasteners having an engaging end for engaging the mounting clip. The mounting clamps allow the frame rail position to be adjusted in two directions, and the mounting clips facilitate rapid mounting of the PV modules to the frame rail structure.

36 Claims, 16 Drawing Sheets

(51) Int. Cl.
  *F24J 2/52* (2006.01)
  *H02S 20/23* (2014.01)
  *F16M 11/00* (2006.01)
  *F16M 13/02* (2006.01)
  *E04C 3/04* (2006.01)
  *F16B 2/12* (2006.01)

(52) U.S. Cl.
  CPC ............ *F24J 2/5258* (2013.01); *H02S 20/23* (2014.12); *E04C 3/02* (2013.01); *E04C 2003/0421* (2013.01); *F16B 2/12* (2013.01); *F24J 2002/5226* (2013.01); *Y02B 10/12* (2013.01); *Y02B 10/20* (2013.01); *Y02E 10/47* (2013.01)

(58) Field of Classification Search
  CPC ......... F24J 2/5245; H02S 20/30; H02S 30/10; F16M 13/02; E04D 13/18; E04C 3/02; E04C 2003/0404; E04C 2003/0421; E04C 2003/043; E04C 2003/0439; E04C 2003/0473; E04C 2003/0465
  See application file for complete search history.

(56) References Cited

U.S. PATENT DOCUMENTS

| | | | |
|---|---|---|---|
| 8,984,818 B2 * | 3/2015 | McPheeters | F24J 2/5205 52/173.3 |
| 9,057,542 B2 * | 6/2015 | Schuit | F24J 2/5205 |
| 9,106,023 B2 * | 8/2015 | Schaefer | F24J 2/5245 |
| 9,299,868 B2 * | 3/2016 | Thomas | H01L 31/042 |
| 2002/0114659 A1 * | 8/2002 | Binna | A47B 57/26 403/65 |
| 2003/0061782 A1 * | 4/2003 | Fisher | B21C 37/104 52/846 |
| 2003/0163969 A1 | 9/2003 | Silverman | |
| 2005/0034414 A1 * | 2/2005 | Unverzagt | E04C 3/07 52/843 |
| 2005/0121577 A1 | 6/2005 | Oddsen, Jr. et al. | |
| 2007/0187081 A1 | 8/2007 | Watanabe et al. | |
| 2007/0246695 A1 | 10/2007 | Hoffend, Jr. | |
| 2008/0010915 A1 | 1/2008 | Liebendorfer | |
| 2009/0250580 A1 | 10/2009 | Strizki | |
| 2010/0276558 A1 * | 11/2010 | Faust | F24J 2/5205 248/222.14 |
| 2010/0313506 A1 | 12/2010 | Schoell | |
| 2011/0265861 A1 | 11/2011 | Nabauer et al. | |
| 2012/0001046 A1 * | 1/2012 | Schmotz | F16B 2/065 248/316.1 |
| 2013/0048815 A1 * | 2/2013 | Wagner | F24J 2/5207 248/228.1 |

FOREIGN PATENT DOCUMENTS

| | | |
|---|---|---|
| DE | 102011050177 A1 | 11/2011 |
| EP | 2146160 A1 | 1/2010 |
| EP | 2194205 A1 | 6/2010 |
| GB | 2463263 A | 3/2010 |
| JP | H0860813 A | 3/1996 |
| WO | 2010112049 A1 | 10/2010 |

* cited by examiner

SYSTEM FOR MOUNTING AND SUPPORTING PHOTOVOLTAIC MODULES

CROSS-REFERENCE TO RELATED APPLICATIONS

This U.S. National Stage Patent Application claims the benefit of International Application serial number PCT/CA2012/000299 filed Mar. 27, 2012, entitled "System For Mounting And Supporting Photovoltaic Modules" which claims priority to U.S. Provisional Patent Application Ser. No. 61/564,580 filed Nov. 29, 2011 and U.S. Provisional Patent Application Ser. No. 61/579,767 filed Dec. 23, 2011, the entire disclosures of the applications being considered part of the disclosure of this application, and hereby incorporated by reference.

FIELD OF THE INVENTION

The instant invention relates generally to a system for mounting and supporting photovoltaic (PV) modules. More particularly, the instant invention relates to an adjustable mounting system including a frame rail that is formed with a longitudinally extending channel for retaining a plurality of mounting clips, and a mounting clamp for anchoring the frame rail to a support base or structure.

BACKGROUND OF THE INVENTION

The use of photovoltaic (PV) modules, which are also known as solar panels, is becoming increasingly popular as a means for providing a supplemental source of electric power in both commercial and residential applications. Neglecting the environmental impact that is associated with fabricating and transporting the PV modules and their related support structures in the first place, this type of system is capable of converting solar radiation into electrical power without emitting any greenhouse gases or creating other forms of harmful pollution. As a result, shifting to a heavier reliance on the use of PV modules for generating electrical power is often touted as a partial solution to the problem of supplying electric power to a growing and increasingly urbanized population, while at the same time slowing the depletion of fossil fuel reserves and protecting the environment.

PV modules convert solar radiation, which is for all intents and purposes a limitless source of energy, into useful electric power. Unfortunately, due to the low energy intensity of solar radiation and the low conversion efficiency of some PV modules, such systems often require dozens, hundreds or even thousands of independent PV modules to service the end-use of the energy. Constructing a PV power generation system currently involves installing a foundation system upon which a module structural support frame is secured, and then mounting each of the individual PV modules to the support frame. The PV modules are then grouped electrically together into PV strings, which are fed to an electric harness. The harness conveys electric power generated by the PV modules to an aggregation point and onward toward electrical inverters. The overall cost of implementing a PV power generation system is therefore heavily influenced by the costs that are associated with installing the PV modules on a roof, wall, or some other support structure. Moreover, the variety of surfaces on which the PV modules may be mounted requires a wide range of flexibility and adaptability in the mounting hardware that is used to structurally anchor the PV modules to the surface. Accordingly, a simplified, adjustable and cost effective system for PV module installation is needed.

Additionally, it is often the case that PV modules are installed in exposed areas where they are subjected routinely to high winds and heavy snow loads. As a result, the frame rails that are used to support the PV modules may be required to carry a torsion mode resulting from a wind load that is normal to the surface of the PV modules as well as a gravitational load due to snow coverage. The resulting twisting of the support frames may lead to structural failure, which can cause damage to the PV modules that are supported thereon and possibly disrupt the supply of electrical power from the affected system. For instance, frame rails that are roll-formed and welded along a seam are susceptible to corrosion over time, due to the destruction of anti-corrosion coatings that occurs during the welding step. Corrosion along the weld seam eventually reduces the ability of the frame rails to carry the torsion mode. Accordingly, there is also a need for a PV module installation system that is capable of withstanding the various loads that occur under adverse weather conditions.

It would be beneficial to provide a system and method for mounting and supporting photovoltaic modules, which overcome at least some of the above-mentioned limitations or disadvantages of the prior art.

SUMMARY OF THE INVENTION

According to one aspect, the invention is directed to a clamp system for securing a frame rail of a photovoltaic (PV) module support structure, comprising: a mounting element having a frame rail support portion and having a slot defined within a surface of the frame rail support portion; an elongated member having a generally cylindrical body extending along a longitudinal axis between first and second opposite ends thereof, the elongated member having a head at the first end and having a threaded portion at the second end; and first and second retaining members each having a frame rail engaging end and a fastening end; wherein, in an assembled condition, the first and second retaining members extend through the slot of the mounting element such that the respective frame rail engaging ends are disposed on one side of the frame rail support portion and the respective fastening ends are disposed on the other side of the frame rail support portion, the frame rail engaging ends being spaced-apart and facing one another for receiving therebetween a base portion of a frame rail, the elongated member extending through a plurality of openings defined within the fastening end of each of the first and second retaining members, the head of the elongated member engaging the first retaining member and the threaded portion of the elongated member threadedly engaging the second retaining member, such that a rotational movement of the elongated member about the longitudinal axis thereof is converted into a linear movement of the second retaining member relative to the first retaining member.

According to one aspect, the invention is directed to a method of securing a frame rail of a photovoltaic (PV) module support structure, comprising: providing a mounting element having a frame rail support portion and having a slot defined within a surface of the frame rail support portion; arranging first and second retaining members within the slot of the mounting element such that a frame rail engaging end of each one of the first and second retaining members is disposed on one side of the frame rail support portion and a fastening end of each one of the first and second retaining members is disposed on the other side of the frame rail support portion; inserting an elongated member through a plurality of openings defined within the fastening end of each of the first and second retaining members, such that a head of the elongated member engages the fastening end of first retaining member and a threaded portion of the elongated member threadedly engages a threaded surface of the fastening end of the second retaining member; positioning a base portion of a frame rail adjacent to the frame rail support portion of the mounting element and between the frame rail engaging ends of the first and second retaining members; and rotating the elongated member about a longitudinal axis thereof such that the threaded portion of the elongated member advances along the threaded surface of the fastening end of the second retaining member, thereby relatively moving the first retaining member in a direction toward the second retaining member so as to clamp the base portion of the frame rail between the respective frame rail engaging ends.

According to one aspect, the invention is directed to a system for supporting a photovoltaic (PV) module, comprising: a frame rail having a face that is formed so as to define a longitudinally extending channel, the longitudinally extending channel being open to the face, and the frame rail having a base that is opposite the face, a width of the base being greater than a width of the face; a mounting element having a frame rail support portion and having a slot defined within a surface of the frame rail support portion; an elongated member having a generally cylindrical body extending along a longitudinal axis between first and second opposite ends thereof, the elongated member having a head at the first end and having a threaded portion at the second end; and first and second retaining members each having a frame rail engaging end and a fastening end; wherein, in an assembled condition, the first and second retaining members extend through the slot of the mounting element such that the respective frame rail engaging ends are disposed on one side of the frame rail support portion and the respective fastening ends are disposed on the other side of the frame rail support portion, the frame rail engaging ends being spaced-apart and facing one another for receiving therebetween the base of the frame rail, the elongated member extending through a plurality of openings defined within the fastening end of each of the first and second retaining members, the head of the elongated member engaging the first retaining member and the threaded portion of the elongated member threadedly engaging the second retaining member, such that a rotational movement of the elongated member about the longitudinal axis thereof is converted into a linear movement of the second engaging member relative to the first engaging member.

According to one aspect, the invention is directed to a frame rail for supporting a photovoltaic (PV) module, the frame rail having a face and being formed with a longitudinally extending channel that is open at the face, the channel having a base, opposite channel sidewalls extending away from the base, and two flanges extending one each away from a respective one of the opposite channel sidewalls, the metal that forms each one of the two flanges defining a retaining surface facing toward the base of the channel and being bent back upon itself thereby forming an edge along each one of the two flanges, the edge along each one of the two flanges joining a respective one of the retaining surfaces and the face of the frame rail, the retaining surface of each flange including a lip adjacent to the edge of the respective flange, the lip being shaped for engaging a mating surface of a mounting clip.

According to one aspect, the invention is directed to a frame rail for supporting a photovoltaic (PV) module, the frame rail fabricated from a sheet metal blank and having a base surface within which opposite side edges of the sheet metal blank are joined together to form a seam that extends continuously along a length of the frame rail between opposite ends thereof, the frame rail having opposite sidewalls extending from the base surface to a mounting face that is formed with a longitudinally extending channel having opposite channel sidewalls and a channel base extending between said opposite channel sidewalls, the sheet metal blank being folded back upon itself so as to form along each side of the channel a flange having an edge that is curved in a direction transverse to the length of the frame rail, wherein the sheet metal blank is folded about the curved edge of each of the flanges by an angle that is greater than about 180° so as to form a protruding lip proximate the edge of each of the flanges, and wherein the opposite sidewalls and the base surface of the frame rail cooperate to form a flange-like projection proximate the base surface and extending along each side of the frame rail in the longitudinal direction.

According to one aspect, the invention is directed to a method of forming a frame rail for supporting a photovoltaic (PV) module, comprising: providing a sheet metal blank having opposite side edges; bending the sheet metal blank so as to form a closed profile, the closed profile including: a mounting face that is formed with a longitudinally extending channel opening to the mounting face; a base surface that includes a portion of the sheet metal blank adjacent to each of the opposite side edges thereof; and opposite sidewalls extending between the mounting face and the base surface, wherein the channel is formed to define: a channel base; opposite channel sidewalls extending away from the channel base; and two flanges extending one each away from a respective one of the opposite channel sidewalls, the metal that forms each one of the two flanges defining a retaining surface facing toward the channel base and being bent back upon itself thereby forming an edge along each one of the two flanges, the edge along each one of the two flanges joining a respective one of the retaining surfaces and the mounting face of the frame rail, the retaining surface of each flange including a lip adjacent to the edge of the respective flange, the lip being shaped for engaging a mating surface of a mounting clip; and joining together the opposite side edges of the sheet metal blank along a seam within the base surface, the seam extending along the longitudinal direction of the frame rail and being other than a welded seam.

According to one aspect, the invention is directed to a system for mounting a photovoltaic (PV) module, comprising: a frame rail having a face and being formed with a longitudinally extending channel that is open at the face, the channel having a base, opposite channel sidewalls extending away from the base, and two flanges, each one of the two flanges extending away from a respective one of the opposite channel sidewalls, the metal that forms each one of the two flanges defining a retaining surface facing toward the base of the channel and being bent back upon itself thereby forming an edge along each one of the two flanges, the edge along each one of the two flanges joining a respective one of the retaining surfaces and the face of the profile rail, the retaining surface of each flange including a lip adjacent to the edge of the respective flange for engaging a mating surface of a mounting clip; a fastener having an engaging end; a module clamp carried at an end of the fastener that is opposite the engaging end; and a mounting clip having a support end and having a retaining end, the retaining end comprising a pair of pendent legs extending away from the support end, each one of the pair of pendent legs having a mating surface that is shaped for engaging the lip adjacent to the edge of one of the flanges of the frame rail, the support end having an opening defined therethrough for receiving the engaging end of the fastener; wherein, in an assembled condition, the retaining end of the mounting clip is disposed within the longitudinally extending channel of the frame rail and the fastener interconnects the module clamp and the mounting clip, and wherein an edge portion of the PV module is retained between the support end of the mounting clip and the module clamp.

According to one aspect, the invention is directed to a method of mounting photovoltaic (PV) modules to a frame rail of a PV module support structure, comprising: providing a frame rail having a face and being formed with a longitudinally extending channel that is open at the face, the channel having a base, opposite channel sidewalls extending away from the base, and two flanges extending one each away from a respective one of the opposite channel sidewalls, the metal that forms each one of the two flanges defining a retaining surface facing toward the base of the channel and being bent back upon itself thereby forming an edge along each one of the two flanges, the edge along each one of the two flanges joining a respective one of the retaining surfaces and the face of the frame rail, the retaining surface of each flange including a lip adjacent to the edge of the respective flange, the lip being shaped for engaging a mating surface of a mounting clip; providing a mounting clip comprising a support end and having a retaining end, the retaining end comprising a pair of pendent legs extending away from the support end, each one of the pair of pendent legs having a mating surface that is shaped for engaging the lip adjacent to the edge of one of the flanges of the frame rail, the support end having an opening defined therethrough for receiving a threaded end of a fastener; aligning the pendent legs of the mounting clip with the channel of the frame rail and applying a force so as to insert the pendent legs into the channel such that the mating surface of each of the pendent legs engages the lip of a respective one of the flanges; and using a fastener, securing an edge portion of the PV module to the mounting clip, comprising securing an engaging end of the fastener within the opening of the support end of the mounting clip and thereafter turning the fastener in a securing direction so as to clamp down the edge portion of the PV module.

BRIEF DESCRIPTION OF THE DRAWINGS

The instant invention will now be described by way of example only, with reference to the attached drawings, wherein similar reference numerals denote similar elements throughout the several views, and in which:

FIG. 9b shows enlarged detail of the longitudinally extending channel of the frame rail of FIG. 9a;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
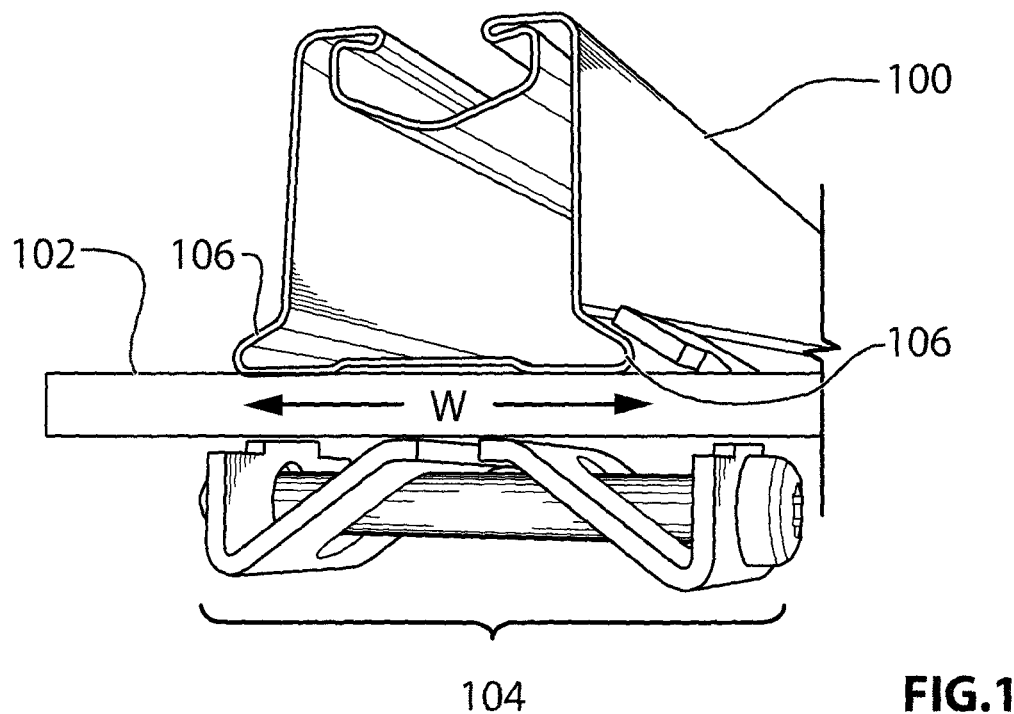
FIG. 1 is a perspective view showing an end region of a frame rail and a mounting clamp, according to a first embodiment of the invention.

FIG. 1 is a perspective view showing an end region of a frame rail 100 and a mounting clamp 104, according to a first embodiment of the instant invention. Frame rail 100 is formed from a sheet metal blank, such as for instance a surface-coated steel, and has a closed profile with a longitudinally extending channel that opens to one of the faces of the frame rail 100. A flange-like projection 106 extends along each side of the frame rail 100, proximate to the base thereof, thereby forming a widened base. The frame rail 100 is shown in FIG. 1 by way of a specific and non-limiting example only, and various modifications to the shape of the frame rail profile may be readily envisaged.

Figure 2:
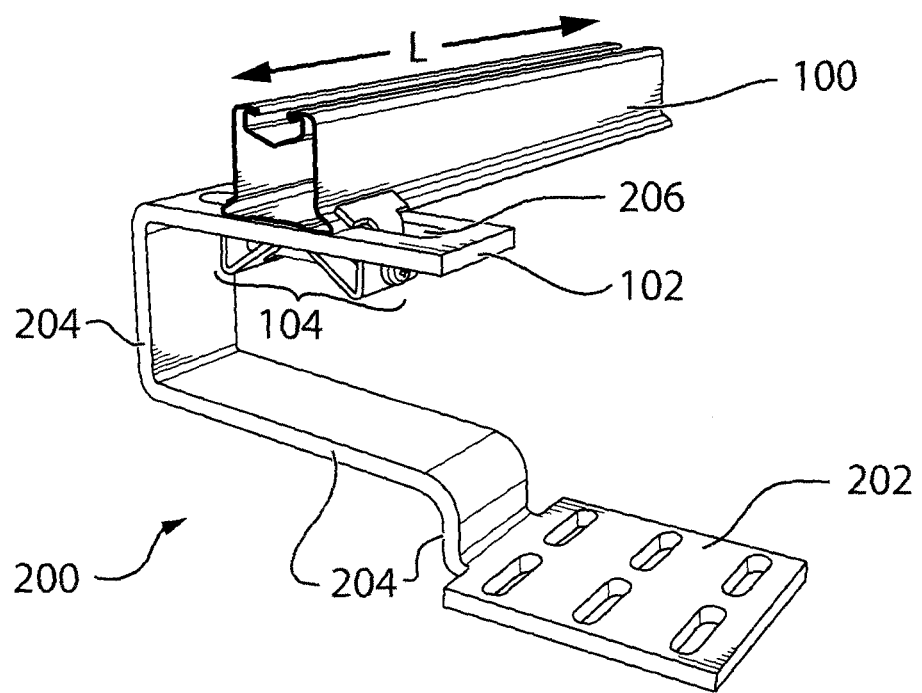
FIG. 2 is a perspective view showing a frame rail secured to a roof-mount element using a mounting clamp, according to the first embodiment of the invention.

Referring now to FIGS. 1 and 2, the mounting clamp 104 detachably secures the frame rail 100 to a frame rail support portion 102 of a roof-mount element 200. In this specific and non-limiting example, the roof-mount element 200 includes a roof-engaging end 202 for securing the roof-mount element 200 to a roof surface of a structure. Spacer sections 204 of the roof-mount element 200 are provided in order to offset the frame rail support portion 102 from the roof-engaging end 202 in both the vertical and the horizontal direction. The offset that is provided by the spacer sections 204 facilitates mounting of the roof-mount element 200 to the roof surface, and accommodates placement of roofing materials such as for instance shingles or tiles.

A slot 206 is defined within the frame rail support portion 102 of the roof-mount element 200. When the mounting clamp 104 engages the frame rail 100 as is shown in FIG. 2, the slot 206 extends in a direction that is transverse to the longitudinal direction along the length "L" of the frame rail 100. The slot 206 has a length that exceeds a maximum width "W" at the widened base of the frame rail 100, such that the location of the mounting clamp 104 within the slot 206 may be adjusted during installation in order to compensate for imprecise placement of the roof-mount element 200 on the roof surface and/or minor misalignment of the frame rail 100 itself.

Figure 3:
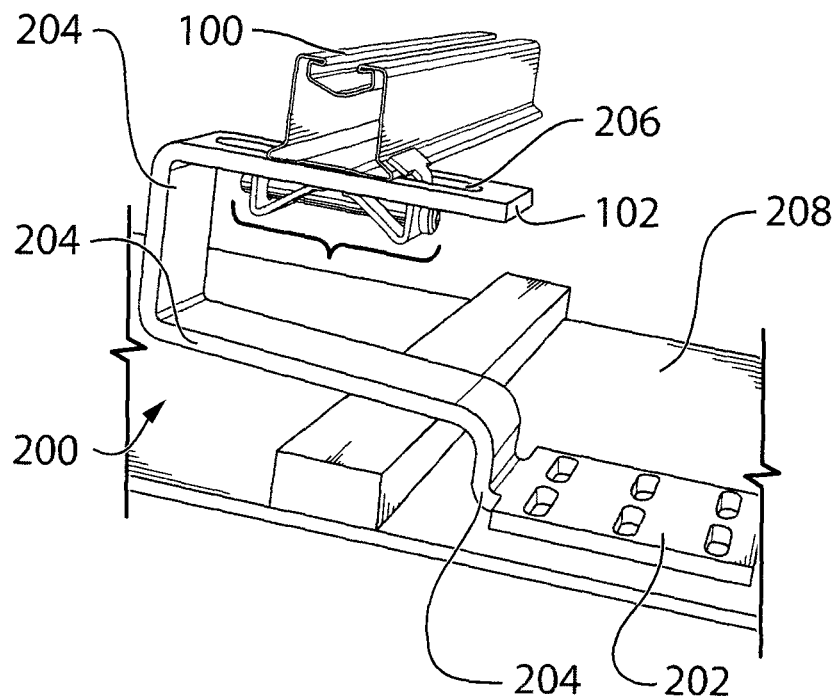
FIG. 3 is a perspective view showing the roof-mount element of FIG. 2 secured to a roof, and in which the roofing tiles have been omitted for clarity.
Figure 4:
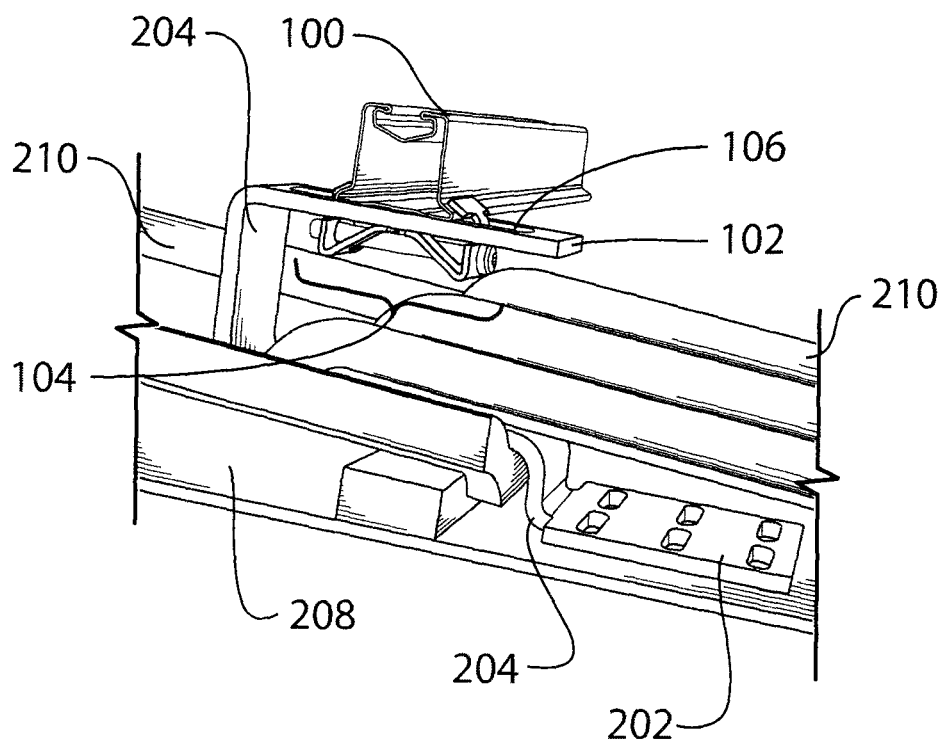
FIG. 4 is a perspective view showing the roof-mount element of FIG. 2 secured to a roof, and in which the roofing tiles are also depicted.
Figure 5:
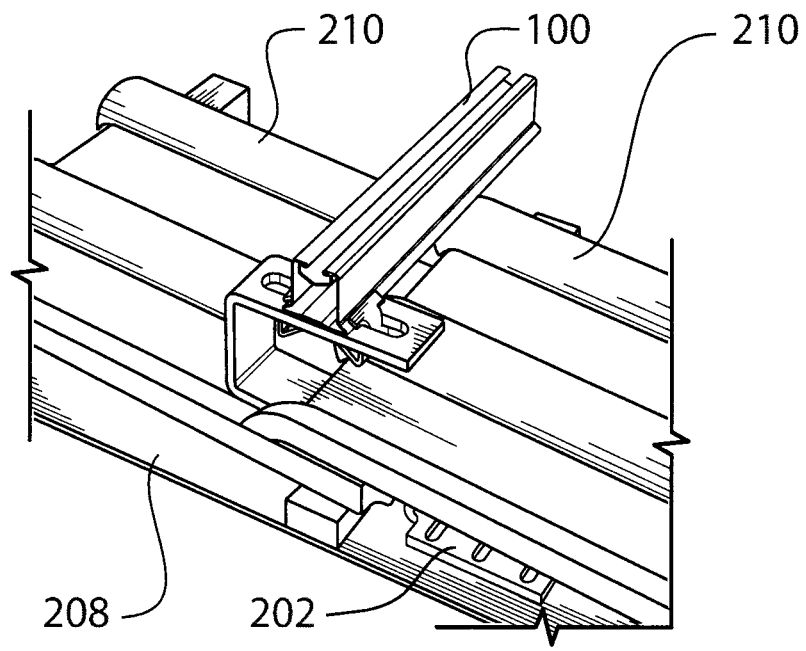
FIG. 5 is another perspective view showing the roof-mount element of FIG. 2 secured to a roof, and in which the roofing tiles are also depicted.

FIGS. 3 and 4 show an end view and a side view, respectively, of the frame rail 100 secured to the roof-mount element 200 via the mounting clamp 104. The frame rail 100 is seated directly onto the frame rail support portion 102. One end of the mounting clamp 104 extends through the slot 206 and engages the flange-like projections 106 of the frame rail 100, as described in greater detail below. As is shown most clearly in FIG. 3, the frame rail support portion 102 is substantially parallel to the roof-engaging end 202 of the roof-mount element 200. In this way, the PV modules are mounted in an orientation that is substantially parallel to the roof surface 208. FIGS. 3 and 4 also show the placement of roofing material relative to the roof-mount element 200. In particular, roofing tiles 210 cover the roof-engaging end 202, such that the spacer segments 204 extend out through spaces between adjacent tiles 210 and rise to a height that is above the level of the roofing tiles 210. FIG. 5 shows the frame rail 100 supported above the roofing tiles 210 and extending toward a not illustrated second end thereof, which is also supported above the roofing tiles 210 in a similar fashion.

Figure 6:
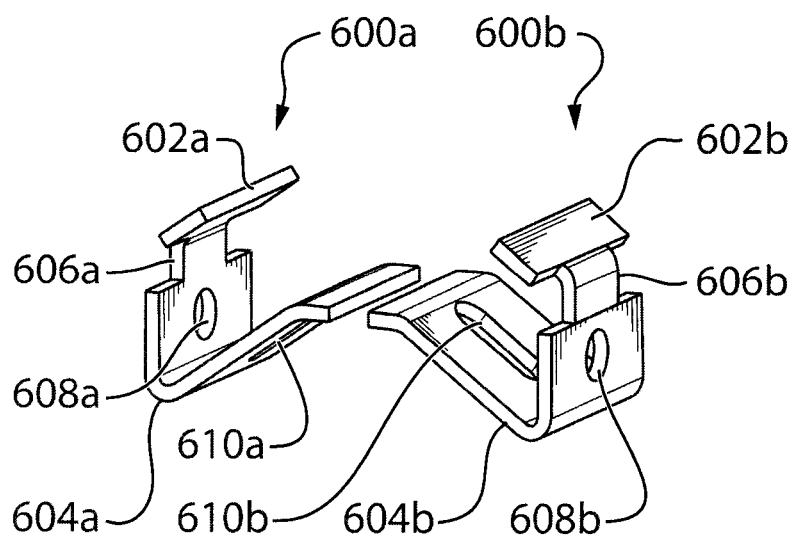
FIG. 6 is a perspective view showing the retaining members of the mounting clamp, according to the first embodiment of the invention.
Figure 7:
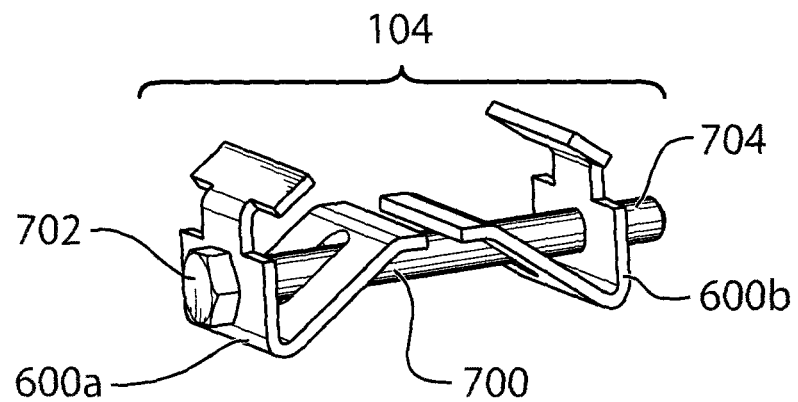
FIG. 7 is a perspective view showing the mounting clamp, according to the first embodiment of the invention, in an assembled condition.

FIG. 6 is a perspective view showing a first retaining member 600a and a second retaining member 600b of the mounting clamp 104. FIG. 7 is a perspective view showing the mounting clamp 104 in an assembled condition. Each of the first and second retaining members 600a/600b comprises a frame rail engaging end 602a/602b connected to a fastening end 604a/604b via a slot engaging portion 606a/606b. Openings 608a and 610a are defined within the fastening end 604a of the first retaining member 600a, and openings 608b and 610b are defined within the fastening end 604b of the second retaining member 600b. As is shown in FIG. 6, the openings 608a and 608b are generally circular and are defined within portions of the fastening ends 604a and 604b that are substantially parallel, one relative to the other, when the mounting clamp 104 is in the assembled condition. The openings 610a and 610b are elongated slot-shaped openings and are defined within portions of the fastening ends 604a and 604b that are inclined, one toward the other, when the mounting clamp 104 is in the assembled condition. As is shown in FIG. 7, an elongated member 700 passes through the openings 608a and 610a in the fastening end 604a of the first retaining member 600a and through the openings 608b and 610b in the fastening end 604b of the second retaining member 600b. The elongated member includes a head 702 at a first end thereof and a threaded portion 704 at a second end opposite the first end. For instance, the elongated member 700 is a bolt or a screw. The head 702, which is dimensioned larger than the opening 608a, stops adjacent to the first retaining member 600a and engages the surface through which the opening 608a is defined. The threaded portion 704 of the elongated member 700 extends through the opening 608b and engages a threaded surface that is carried by the second retaining member 600b. For instance, the opening 608b is formed with an internal thread for engaging the threaded portion 704 of the elongated member 700. Alternatively, an integrated threaded nut (not shown) is provided adjacent to the opening 608b for engaging the threaded portion 704 of the elongated member 700.

In order to secure the frame rail 100 to the frame rail mounting portion 102, the first and second retaining members 600a and 600b are extended through the slot 206 that is defined within the frame rail support portion 102 of the roof-mount element 200, as is shown for instance in FIG. 2. When so inserted, the frame rail engaging ends 602a and 602b are disposed adjacent to the surface along one side of the frame rail support portion 102, and the fastening ends 604a and 604b are disposed adjacent to the surface along the other side of the frame rail support portion 102. The slot engaging portions 606a and 606b are disposed within the slot 206 that is defined through the frame rail support portion 102. The elongated member 700 is then inserted through the plurality of openings that is defined within each of the fastening ends 604a and 604b, so as to interconnect the first and second retaining members 600a and 600b, respectively. Once interconnected by the elongated member 700, the first and second retaining members 600a and 600b cannot be removed from the slot 206. Accordingly, the mounting clamp 104 may be pre-assembled onto the roof-mount element 200 at a factory or at another indoor facility prior to being transported to the installation site. Alternatively, the mounting clamp 104 may be assembled at the installation site.

Thereafter, rotational movement of the elongated member 700 about its longitudinal axis is converted into relative linear movement between the first and second retaining members 600a and 600b. That is to say, rotating the elongated member 700 causes the retaining members 600a and 600b to slide within the slot 206, so as to vary the distance between the first and second retaining members 600a and 600b. More particularly, turning the elongated member 700 in a first direction spaces the first and second retaining members 600a and 600b further apart, such that the frame rail 100 may be received between the frame rail engaging ends 602a and 602b. Turning the elongated member 700 in a second direction that is opposite the first direction draws the first and second retaining members 600a and 600b closer together, such that the respective frame rail engaging ends 602a and 602b engage the frame rail 100. The frame rail engaging ends 602a and 602b are angled one toward the other when the mounting clamp 104 is in the assembled condition, so as to substantially match the inclination of the flange-like projections 106 of the frame rail 100. In this way, the frame rail engaging ends 602a and 602b of the first and second retaining members 600a and 600b, respectively, engage the flange-like projections 106 along opposite sides of the frame rail 100 in a secure manner.

The mounting position of the frame rail 100 relative to the roof-mount element 200 is adjustable in two directions. As discussed above, the position of the first and second retaining members 600a and 600b, respectively, may be varied within the slot 206 so as to support minor adjustments to the position of the frame rail along a direction that is transverse to the length of the frame rail 100. Additionally, prior to tightening the mounting clamp 104 the frame rail 100 may be moved freely in a direction along its length. Once the frame rail 100 is positioned properly, it may be locked in place simply by tightening the mounting clamp 104.

Figure 8A:
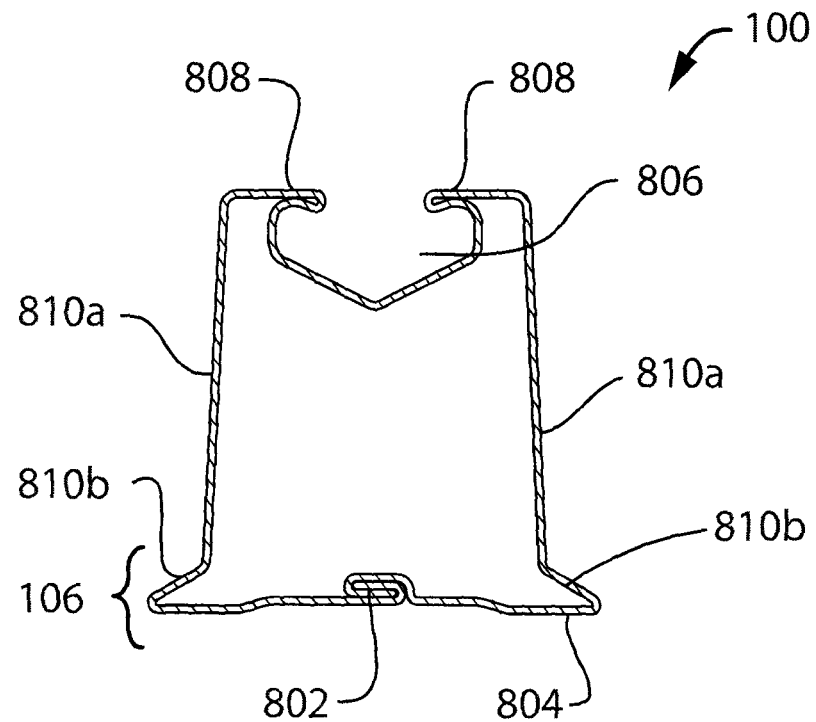
FIG. 8a is an end view showing a frame rail profile.

FIG. 8a is an end view showing additional detail of the frame rail 100. The frame rail 100 is fabricated from a sheet metal blank having opposite edges that are joined together without welding. In particular, the opposite edges are joined together along a seam 802 that is formed within an approximately central portion of a base surface 804 of the frame rail 100, and that extends continuously along the length of the frame rail 100. More particularly, each of the opposite edges of the sheet metal blank is hemmed, and the hemmed edges are joined together to form a grooved-seam, as is illustrated in FIG. 8a. A longitudinally extending channel 806 opens to a face 808 that is opposite the base surface 804. The channel 806 is shaped to accept and retain not illustrated mounting hardware for securing PV modules adjacent to the face 808. Opposite sidewalls 810 extend between the face 808 and the base surface 804. The frame rail 100 is wider at the base surface 804 than it is at the face 808. As such, the sidewalls 810 diverge one from the other between the face 808 and the base surface 804. More particularly, first portions 810a of the sidewalls diverge at a first rate and second portions 810b of the sidewalls proximate the base surface 804 diverge at a second rate greater than the first rate. The second portions 810b of the sidewalls cooperate with the base surface 804 to define the flange-like projections, shown generally at 106, extending along each side of the frame rail 100.

Figure 8B:
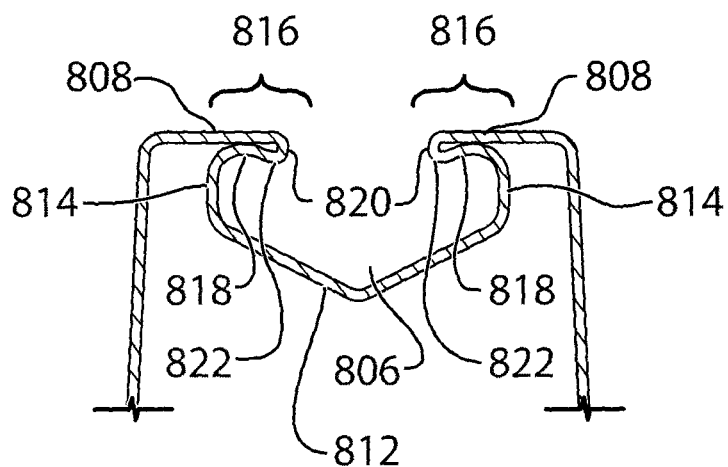
FIG. 8b shows enlarged detail of the longitudinally extending channel of the frame rail of FIG. 8a FIG. 9a is an end view showing an alternative frame rail profile.

Referring now to FIG. 8b, the channel 806 has a generally V-shaped base 812 and opposite sidewalls 814 extending from the base 812. Flanges 816 extend one toward the other away from each of the sidewalls 814. The metal that forms each of the flanges 816 defines a retaining surface 818 facing toward the base 812 of the channel 806, and bends back upon itself so as to form an edge 820 along each one of the two flanges 816. The edge 820 along each one of the two flanges 816 joins a respective one of the retaining surfaces 818 and the face 808 of the frame rail 100. Further, the metal is bent in such a way that the retaining surface 818 of each flange 816 is formed with a lip 822 adjacent to the edge 820 of the respective flange 816. The lip 822 is for engaging a mating surface of a mounting clip, when the mounting clip is inserted into the channel 806, as is described below in greater detail.

Figure 9A:
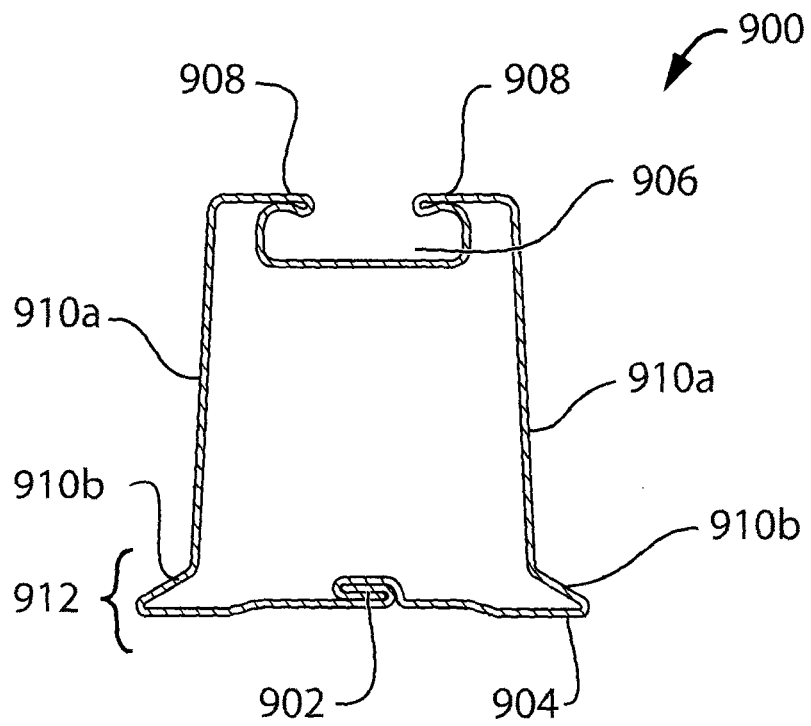

Referring now to FIG. 9a, shown is an end view of a frame rail 900 having an alternative profile. The frame rail 900 is fabricated from a sheet metal blank having opposite edges that are joined together without welding. In particular, the opposite edges are joined together along a seam 902 that is formed within an approximately central portion of a base surface 904 of the frame rail 900, and that extends continuously along the length of the frame rail 900. More particularly, each of the opposite edges of the sheet metal blank is hemmed, and the hemmed edges are joined together to form a grooved-seam, as is illustrated in FIG. 9a. A longitudinally extending channel 906 opens to a face 908 that is opposite the base surface 904. The channel 906 is shaped to accept and retain not illustrated mounting hardware for securing PV modules adjacent to the face 908. Opposite sidewalls 910 extend between the face 908 and the base surface 904. The frame rail 900 is wider at the base surface 904 than it is at the face 902. As such, the sidewalls 910 diverge one from the other between the face 908 and the base surface 904. More particularly, first portions 910a of the sidewalls diverge at a first rate and second portions 910b of the sidewalls proximate the base surface 904 diverge at a second rate greater than the first rate. The second portions 910b of the sidewalls cooperate with the base surface 904 to define flange-like projections, shown generally at 912 in FIG. 9a, extending along each side of the frame rail 900.

Figure 9B:
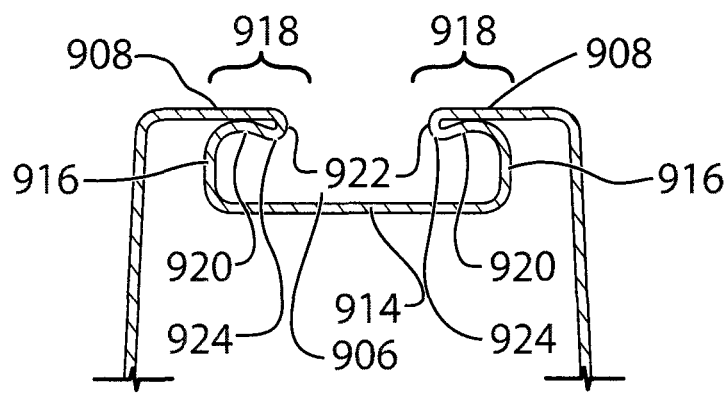

Referring now to FIG. 9b, the channel 906 is formed with a generally flat base 914 and opposite sidewalls 916 extending from the base 914. Flanges 918 extend one toward the other away from each of the sidewalls 910. The metal that forms each of the flanges 918 defines a retaining surface 920 facing toward the base 914 of the channel 906, and bends back upon itself so as to form an edge 922 along each one of the two flanges 918. The edge 922 along each one of the two flanges 918 joins a respective one of the retaining surfaces 920 and the face 908 of the frame rail 900. Further still, the metal is bent in such a way that the retaining surface 920 of each flange 918 is formed with a lip 924 adjacent to the edge 922 thereof. The lip 924 is for engaging a mating surface of a mounting clip when the mounting clip is inserted into the channel 906, as is described below in greater detail.

Figure 9C:
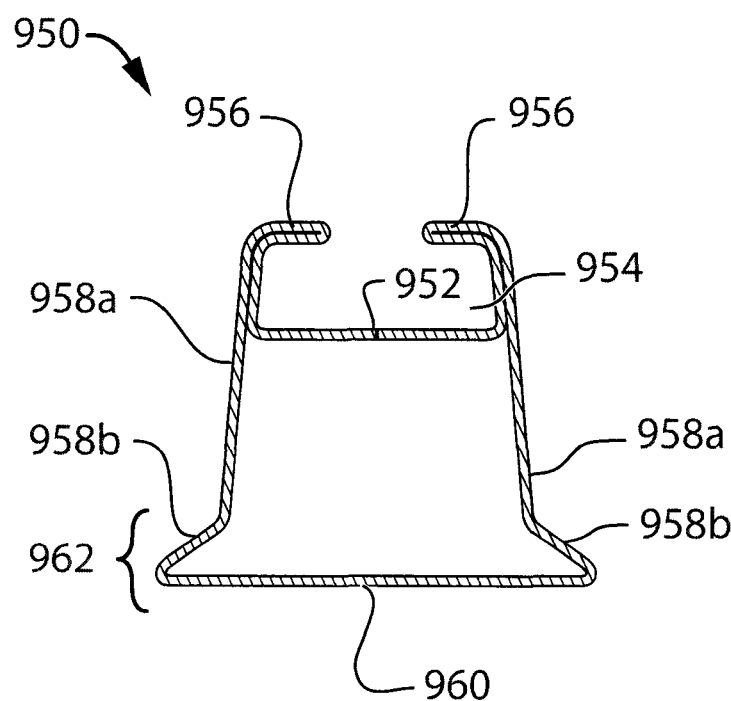
FIG. 9c is an end view of another alternative frame rail profile.

Referring now to FIG. 9c, shown is an end view of a frame rail 950 having yet another alternative profile. The rail frame 950 in this specific and non-limiting example is a roll formed sheet-metal blank and has a weld seam 952 joining the opposite edges of the sheet-metal blank along the bottom of a longitudinally extending channel 954. The frame rail 950 is formed such that the channel 954 opens to a face 956. In particular, the channel 954 is shaped to receive and retain not illustrated mounting hardware for securing the PV modules adjacent to the face 956. Of course, the shape of the channel 954 is not intended to be limiting, and various other channel shapes may be employed.

Referring still to FIG. 9c, opposite sidewalls 958 extend between the face 956 and a base surface 960. The frame rail 950 is wider at the base surface 960 than it is at the face 956. As such, the sidewalls 958 diverge one from the other between the face 956 and the base surface 960. More particularly, first portions 958a of the sidewalls diverge at a first rate and second portions 958b of the sidewalls proximate the base surface 960 diverge at a second rate greater than the first rate. The second portions 958b of the sidewalls cooperate with the base surface 960 to define flange-like projections, indicated generally at 962, which extend along each side of the frame rail 950. The flange-like projections 962 provide surfaces for the mounting clamp 104 to engage.

Figure 9D:
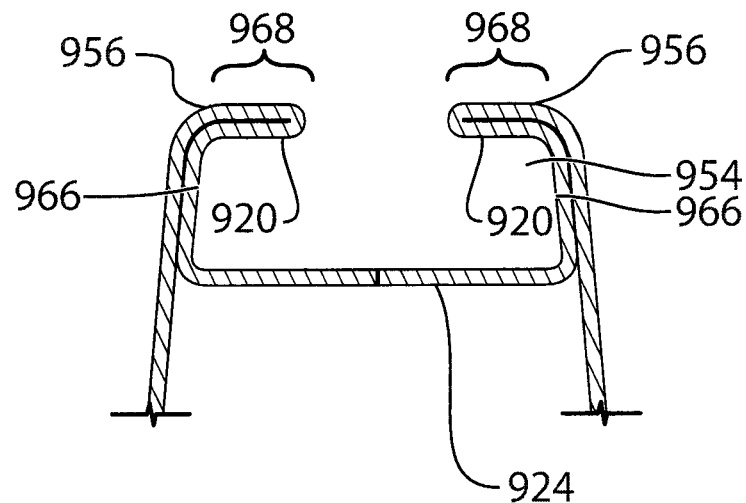
FIG. 9d shows enlarged detail of the longitudinally extending channel of the frame rail of FIG. 9c.

Referring now to FIG. 9d, the channel 954 is formed with a generally flat base 964 and opposite sidewalls 966 extending from the base 964. A flange 968 extends away from each of the sidewalls 966, each flange 968 extending toward the other. The metal that forms each of the flanges 968 defines a retaining surface 970 facing toward the base 964 of the channel 954. Further, the metal is bent back upon itself so as to form an edge 972 along each one of the two flanges 968. The edge 972 along each one of the two flanges 968 joins a respective one of the retaining surfaces 970 and the face 956 of the frame rail 950.

Figure 10:
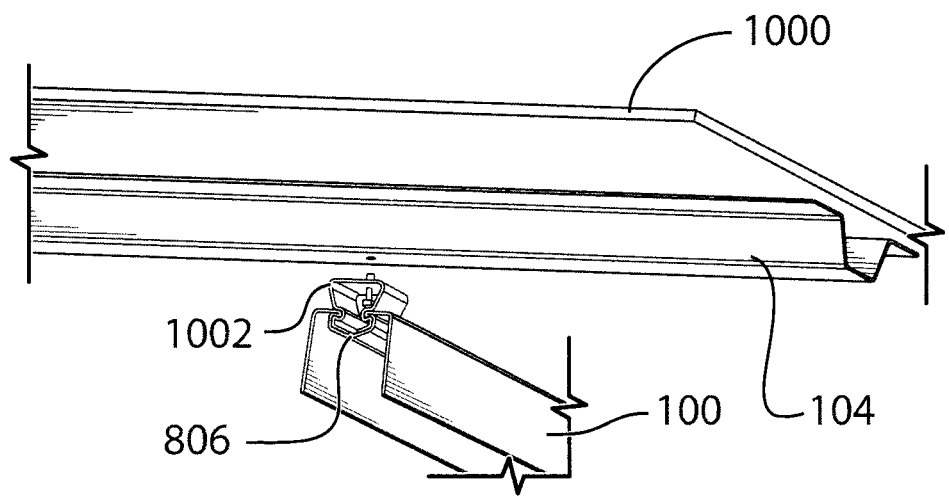
FIG. 10 is a bottom perspective view showing a PV module secured to a frame rail using a mounting clip, according to a second embodiment of the invention.

FIG. 10 shows a bottom perspective view of a PV module 1000, such as for instance a thin-film PV panel, secured to frame rail 100 using a mounting clip 1002 according to a second embodiment of the instant invention. The mounting clip 1002 is secured to a back-rail 1004, which in turn is secured to the PV module 1000. Mounting clip 1002 is fully inserted into and is retained within the channel 806 of the frame rail 100, thereby securing the PV module 1000 to the frame rail 100. The frame rail that is shown in FIG. 10 is, by way of a specific and non-limiting example, the same frame rail 100 that is discussed in detail above with reference to FIGS. 8a and 8b. In the interest of clarity the lower portion of the frame rail 100, which includes the base surface 804 and the flange-like projections 106, is not shown in FIG. 10.

Figure 11:
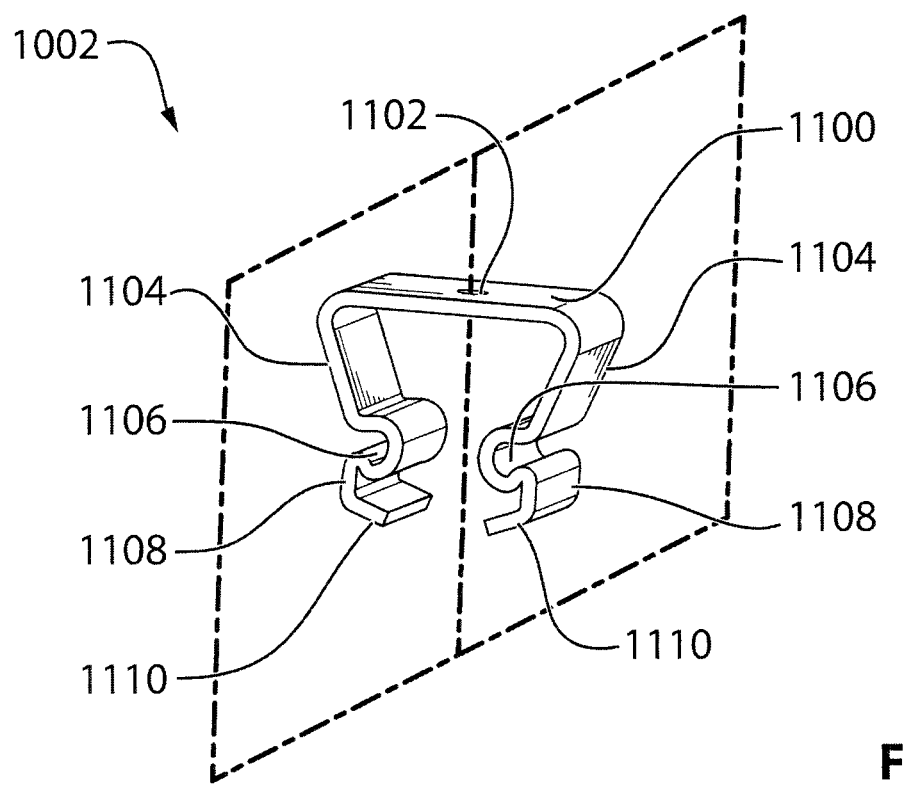
FIG. 11 is a perspective view showing the mounting clip according to the second embodiment of the invention.

FIG. 11 is a perspective view showing enlarged detail of the mounting clip 1002 of FIG. 10. The mounting clip 1002 includes a central body portion 1100 that is for supporting a PV module when in an installed condition. An opening 1102 is defined through the central body portion 1100, the opening 1102 for receiving a not illustrated fastener, such as for instance a rivet, that is used to secure the mounting clip 1002 to a back-rail 1004. A pendant leg 1104 extends away from each end of the central body portion 1100, such that the mounting clip 1002 has a plane of symmetry that is located mid-way between the legs 1104 and that bisects the opening 1102. Each leg 1104 is shaped for engaging known features of the longitudinally extending channel 806 of the frame rail 100. In particular, each leg 1104 includes a segment 1106 that is shaped for engaging the lip 822 along the retaining surface 818 within the channel 806. Another segment 1108 is shaped for engaging a section of the sidewall 814 of the channel 806, and yet another segment 1110 is shaped for engaging the base portion 812 of the channel 806. The shape of the legs 1104, and in particular the segment 1108 that engages the lip 822 along the retaining surface 818, prevents the mounting clip 1002 from being easily removed from the channel 806.

Figure 12:
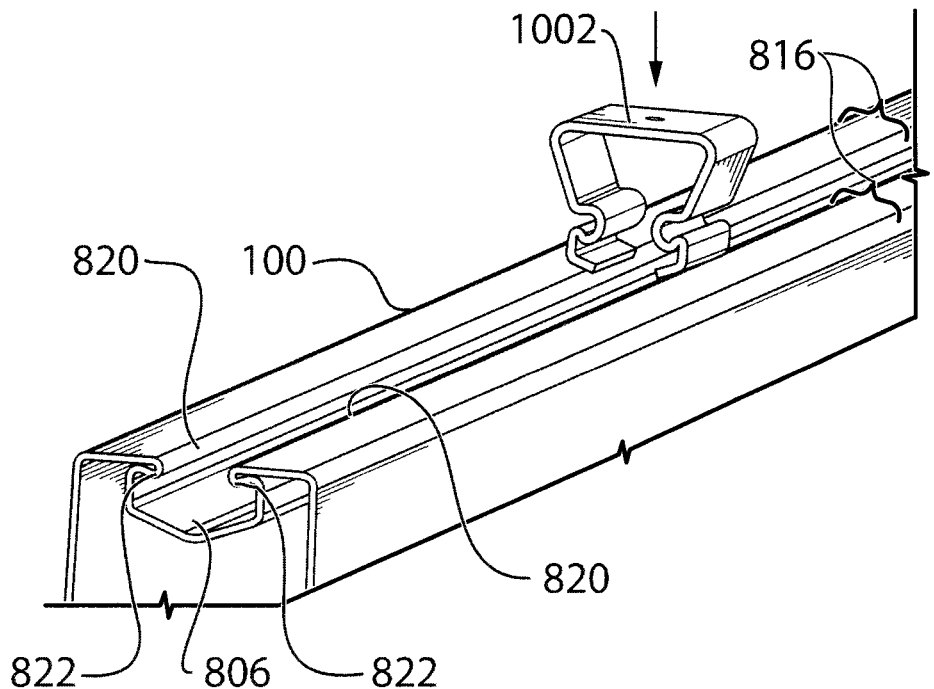
FIG. 12 is a perspective view showing the mounting clip of FIG. 11 prior to insertion into the longitudinally extending channel of a frame rail.
Figure 13:
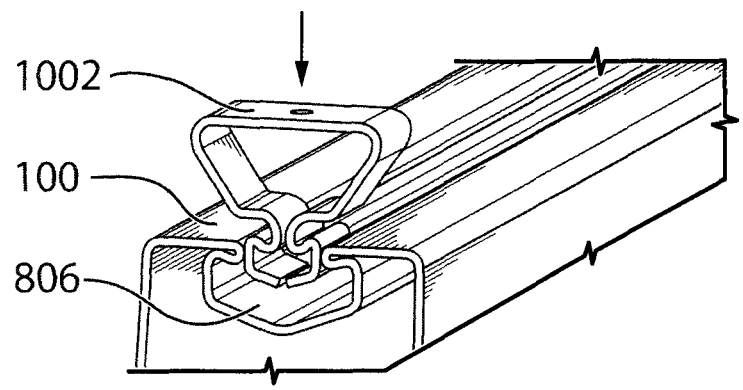
FIG. 13 is a perspective view showing the mounting clip of FIG. 11 after being partially inserted into the longitudinally extending channel of the frame rail.
Figure 14:
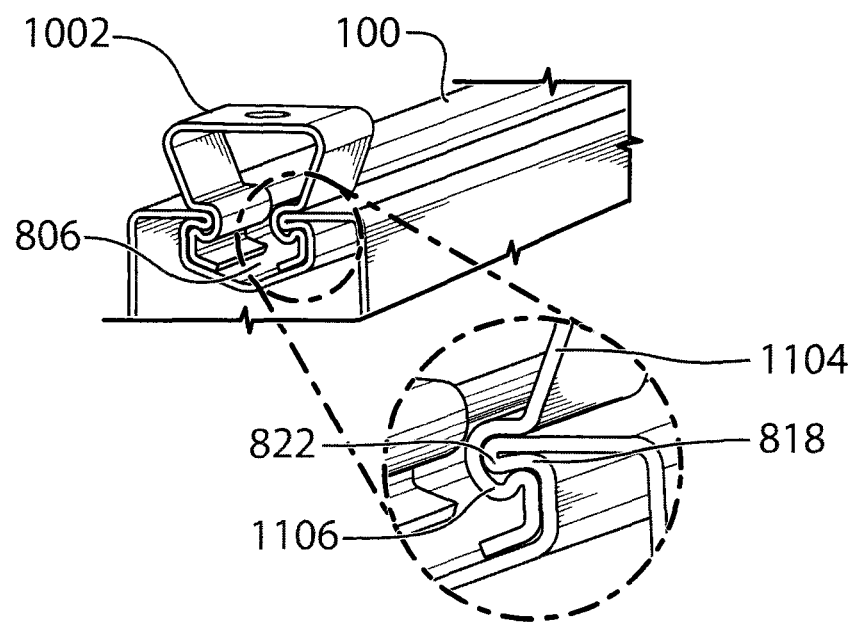
FIG. 14 is a perspective view showing the mounting clip of FIG. 11 after being fully inserted into the longitudinally extending channel of the frame rail.

Referring now to FIG. 12, shown is a perspective view of the mounting clip 1002 of FIG. 11 prior insertion into channel 806 of frame rail 100. The arrow in FIG. 12 indicates a force that is applied to the mounting clip 1002 in order to cause the pendent legs 1004 to bend inwardly one toward the other as the segment 1110, and subsequently the segment 1108, move past the edge 820 of each of the flanges 816. FIG. 13 shows the mounting clip 1002 after being partially inserted into channel 806 of frame rail 100, as a result of applying force along the direction that is indicated by the arrow in the figure. At this point, the space between the segments 1110 of the pendent legs 1104 is substantially closed. Referring now to FIG. 14, the mounting clip 1002 is fabricated from a resilient material, such as for instance spring steel, such that once the segment 1108 of each pendent leg 1104 moves entirely past respective edges 820 of the flanges 816, the pendent legs 1104 each return to their original position and thereby engage the surfaces of the channel 806. The inset in FIG. 14 shows enlarged detail of the interaction between the lip 822 of the retaining surface 818 along the channel 806 and the segment 1106 of one of the pendent legs 1104 of the mounting clip 1002. In combination, the hook-like shape of the segment 1106, the protruding lip 822, and the resiliency of the mounting clip 1002 results in secure fastening of the mounting clip 1002 within the channel 806.

Figure 15:
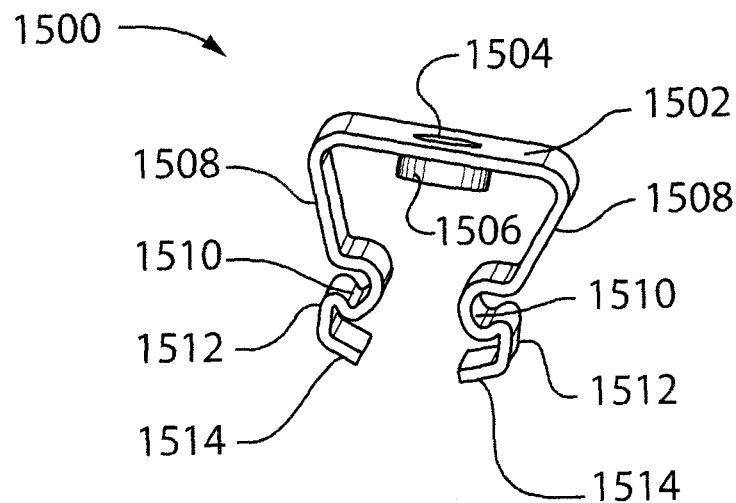
FIG. 15 is a perspective view showing a mounting clip according to a third embodiment of the invention.

FIG. 15 is a perspective view showing a mounting clip according to a third embodiment of the invention. The mounting clip 1500 includes a central body portion 1502 through which an opening 1504 is defined. An integrated fastening element, such as for instance a threaded nut 1506, is pinched or pressed onto the sheet metal of the mounting clip 1500, or is otherwise fixedly secured thereto. Alternatively, of fastening element other than a threaded nut is provided. As is shown in FIG. 15, the threaded nut 1506 is aligned with the opening 1504 and is disposed adjacent to one side of the central body portion 1502. The opening 1504 and threaded nut 1506 are for receiving an engaging end of a not illustrated fastener, such as for instance a threaded end of a bolt, which is used to attach mounting hardware for securing a PV module to the mounting clip 1500.

A pendant leg 1508 extends away from each end of the central body portion 1502, such that the mounting clip 1500 has a plane of symmetry (not shown) that is located mid-way between the legs 1508 and that bisects the opening 1504 and threaded nut 1506. Each leg 1508 is shaped for engaging known features of the longitudinally extending channel 956 of the frame rail 100. In particular, each leg 1508 includes a segment 1510 that is shaped for engaging the lip 822 along the retaining surface 818 within the channel 806. Another segment 1512 is shaped for engaging a section of the sidewall 814 of the channel 806, and yet another segment 1514 is shaped for engaging the base portion 812 of the channel 806. The shape of the legs 1508, and in particular the segment 1510 that engages the lip 822 along the retaining surface 818, prevents the mounting clip 1500 from being easily removed from the channel 806.

Figure 16:
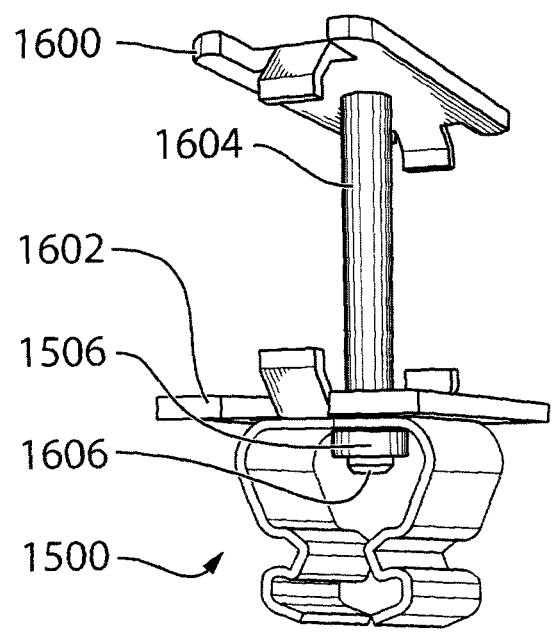
FIG. 16 is a perspective view showing a mounting clip assembly including the mounting clip of FIG. 15 and a pair of module clamps secured thereto via a threaded member.
Figure 17:
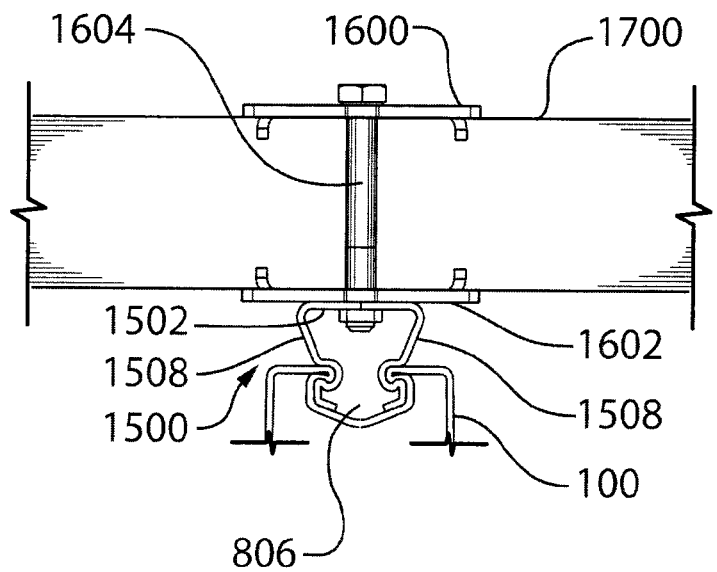
FIG. 17 is a side view showing a PV module secured to a frame rail using the mounting clip assembly of FIG. 16.
Figure 18:
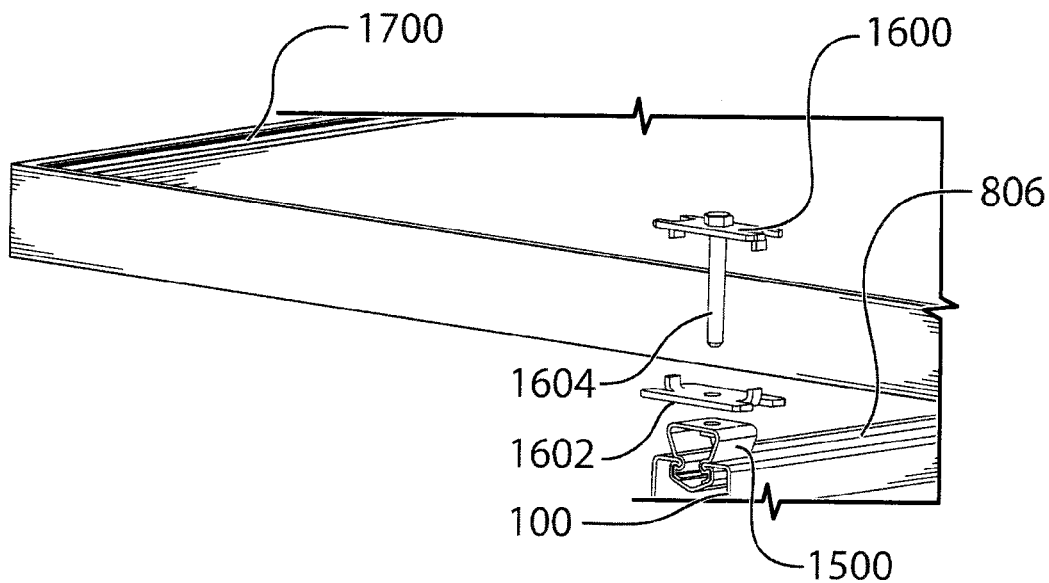
FIG. 18 is an exploded view showing a PV module secured to a frame rail using the mounting clip assembly of FIG. 16.

FIG. 16 is a perspective view showing a mounting clip assembly including the mounting clip 1500 of FIG. 15 and a pair of module clamps 1600 and 1602, which are secured to the mounting clip 1500 via a fastener 1604 having an engaging end 1606, such as for instance a threaded end that engages the threaded nut 1506. The module clamps 1600 and 1602 provided larger contact surfaces for engaging the PV modules, which is necessary particularly when the PV modules are installed in landscape orientation. FIG. 17 is a side view showing a PV module 1700 secured to the mounting rail 100 using the mounting clip assembly of FIG. 16. As is shown in FIG. 17, the pendent legs 1508 of the resilient mounting clip 1500 engage the flange lips, sidewalls and base of the channel 806 in the same manner that is described above with reference to FIG. 14. The central body portion 1502 of the mounting clip 1500 is spaced apart from the frame rail 100. The PV module 1700 is held in place relative to the mounting clip 1500 using module clamps 1600 and 1602, which are tightened together by turning the fastener 1604 in a direction such that the threaded end 1606 advances into the threaded nut 1506. FIG. 18 is an exploded view showing the PV module 1700 moved into position adjacent to the frame rail 100, and disposed between the first and second module clamps 1600 and 1602 of the mounting clip assembly of FIG. 16. To complete the mounting of the PV module 1700, the fastener 1604 is threaded into the threaded nut 1506 of the mounting clip 1500 and is tightened.

Figure 19:
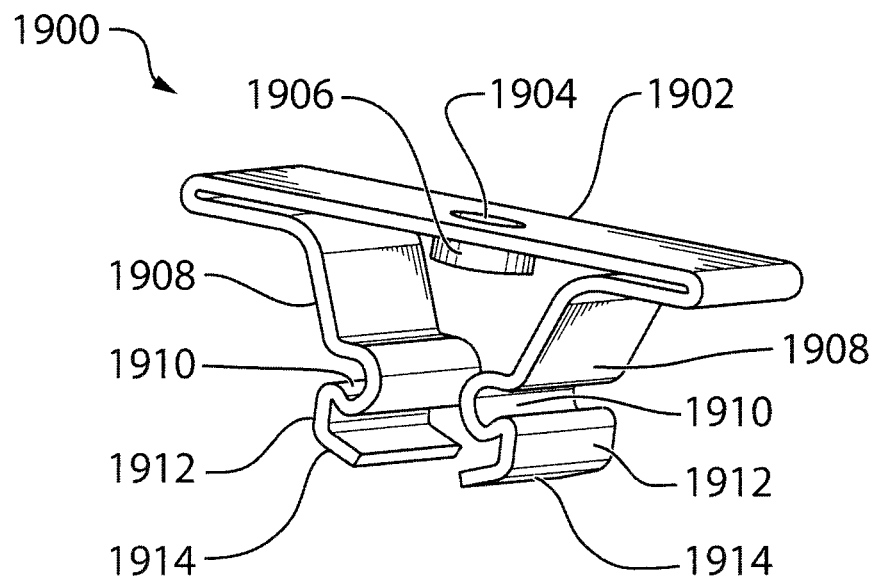
FIG. 19 is a perspective view showing a mounting clip according to a fourth embodiment of the invention.

FIG. 19 is a perspective view showing a mounting clip according to a fourth embodiment of the invention. The mounting clip 1900 includes a central body portion 1902 through which an opening 1904 is defined. An integrated fastening element, such as for instance threaded nut 1906, is pinched or pressed onto the sheet metal of the mounting clip 1900, or is otherwise fixedly secured thereto. Alternatively, a fastening element other than a threaded nut is provided. As is shown in FIG. 19, the threaded nut 1906 is aligned with the opening 1904 and is disposed adjacent to one side of the central body portion 1902. The opening 1904 and threaded nut 1906 are for receiving an engaging end of a not illustrated fastener, such as for instance a threaded end of a bolt, which is used to attach mounting hardware for securing a PV module to the mounting clip 1900.

As is shown in FIG. 19, the metal forming the central body portion 1902 is bent back upon itself at each end of the central body portion 1902, and thereafter extends away from the central body portion 1902 so as to define pendant legs 1908. One pendant leg 1908 extends away from each end of the central body portion 1902, such that the mounting clip 1900 has a plane of symmetry (not shown) that is located mid-way between the legs 1908 and that bisects the opening 1904 and threaded nut 1906. Each leg 1908 is shaped for engaging known features of the longitudinally extending channel 806 of the frame rail 100. In particular, each leg 1908 includes a segment 1910 that is shaped for engaging the lip 822 along the retaining surface 818 within the channel 806. Another segment 1912 is shaped for engaging a section of the sidewall 814 of the channel 806, and yet another segment 1914 is shaped for engaging the base portion 812 of the channel 806. The shape of the legs 1908, and in particular the segment 1910 that engages the lip 822 along the retaining surface 818, prevents the mounting clip 1900 from being easily removed from the channel 806.

Figure 20:
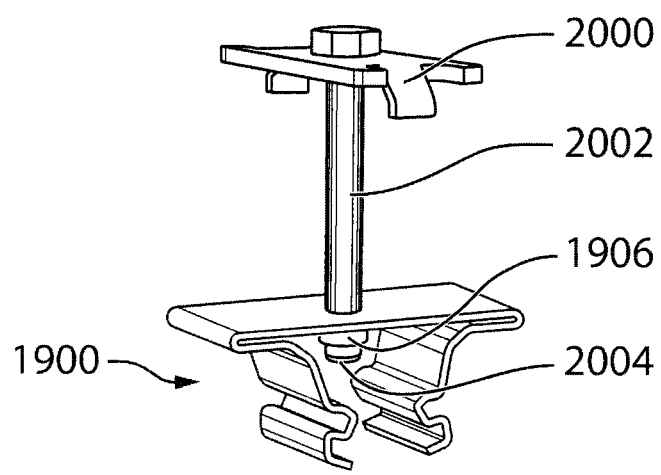
FIG. 20 is a perspective view showing a mounting clip assembly including the mounting clip of FIG. 19 and a module clamp secured thereto via a threaded member.
Figure 21:
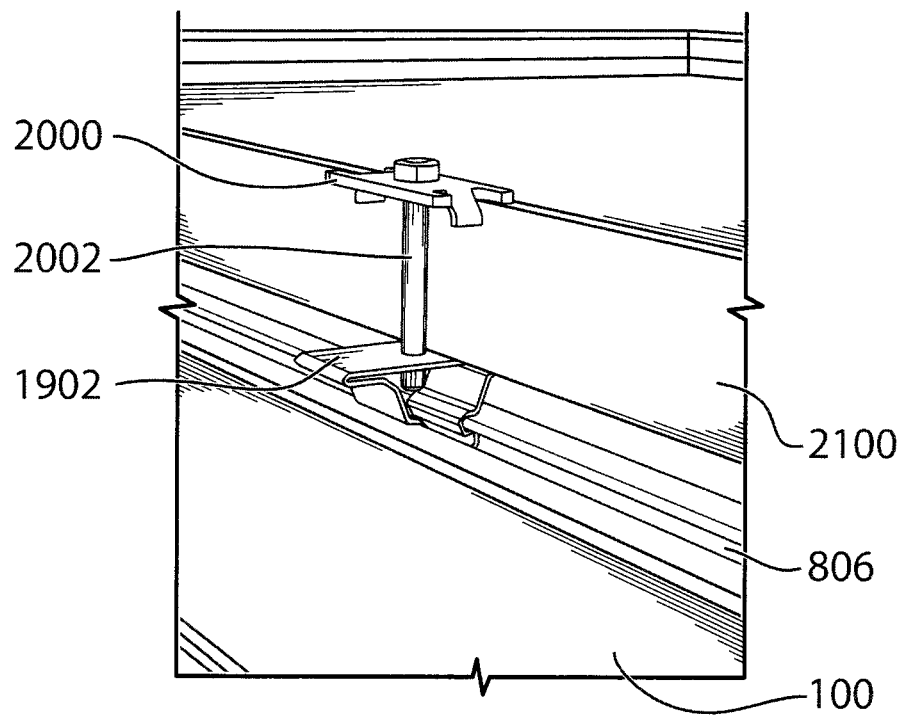
FIG. 21 is a perspective view showing a PV module secured to a frame rail using the mounting clip assembly of FIG. 20.
Figure 22:
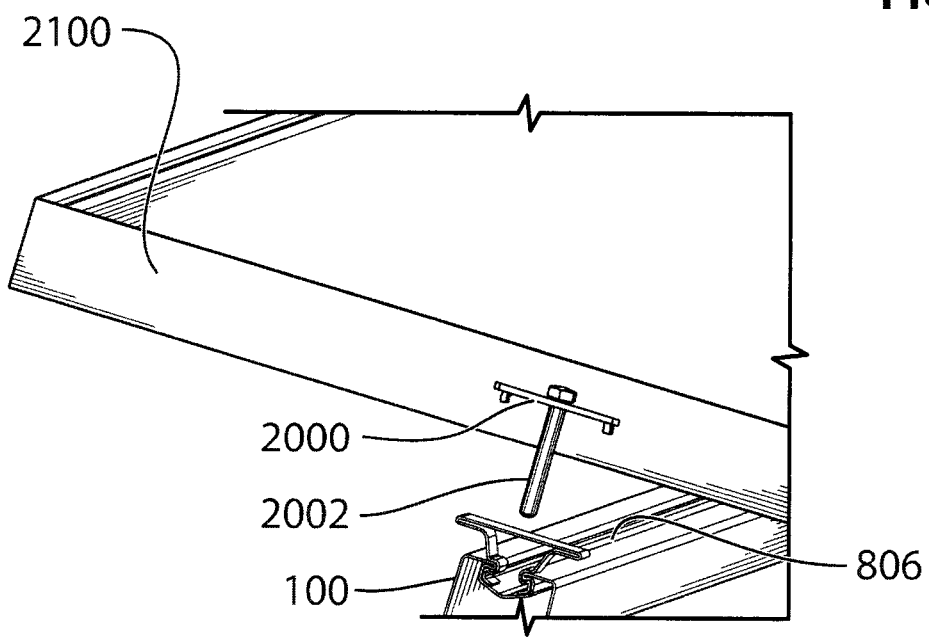
FIG. 22 is an exploded view showing a PV module secured to a frame rail using the mounting clip assembly of FIG. 20.

FIG. 20 is a perspective view showing a mounting clip assembly including the mounting clip 1900 of FIG. 19 and a module clamp 2000 secured thereto via a fastener 2002 having an engaging end 2004, such as for instance a threaded end that engages the fixed nut 1906. FIG. 21 is a perspective view showing a PV module 2100 secured to a mounting rail 100 using the mounting clip assembly of FIG. 20. As is shown in FIG. 21, the mounting clip 1900 is inserted into the channel 806 of frame rail 100. The central body portion 1902 of the mounting clip 1900 is spaced apart from the frame rail 100. The PV module 2100 is held in place relative to the mounting clip 1900 using module clamp 2000. The central body portion 1902 of the mounting clip 1900 is enlarged compared to the central body portion 1502 of the mounting clip 1500, such that the PV module is supported directly on the central body portion 1902. Accordingly, only one module clamp 2000 is required to retain the PV module 2100. FIG. 22 is an exploded view showing the PV module 2100 moved into position adjacent to the frame rail 100, and disposed between the central body portion 1902 and the module clamp 2000 of the mounting clip assembly of FIG. 20. To complete the mounting of the PV module 2100, the fastener 2002 is threaded into the threaded nut 1906 of the mounting clip 1900 and is tightened.

Figure 23:
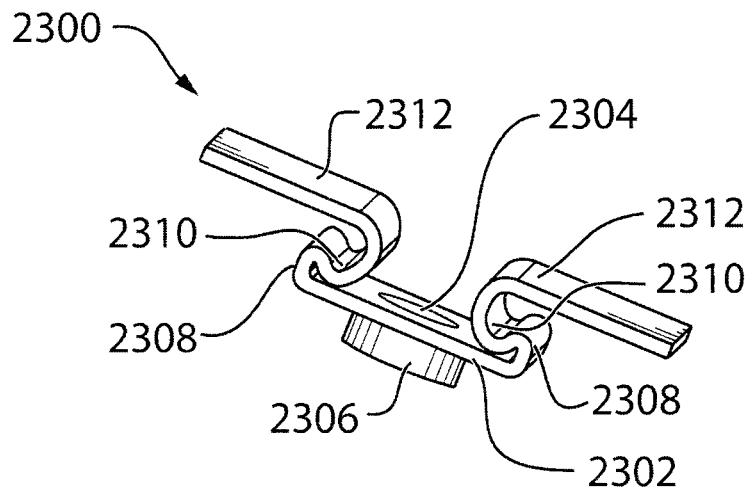
FIG. 23 is a perspective view showing a mounting clip according to a fifth embodiment of the invention.

Referring now to FIG. 23, shown is a perspective view of a mounting clip 2300 according to a sixth embodiment of the instant invention. The mounting clip 2300 includes a central body portion 2302 through which an opening 2304 is defined. An integrated fastening element, such as for instance threaded nut 2306, is pinched or pressed onto the sheet metal of the mounting clip 2300, or is otherwise fixedly secured thereto. Alternatively, a fastening element other than a threaded nut is provided. As is shown in FIG. 23, the threaded nut 2306 is aligned with the opening 2304 and is disposed adjacent to one side of the central body portion 2302. The opening 2304 and threaded nut 2306 are for receiving an engaging end of a not illustrated fastener, such as for instance a threaded end of a bolt, that is used to attach mounting hardware for securing a PV module to the mounting clip 2300.

As is shown in FIG. 23, the metal that forms the central body portion 2302 is bent back upon itself to form an edge 2308 at each end of the central body portion 2302. The bend in the metal continues, so as to form a pair of pendent legs having retaining surfaces 2310 that are shaped to engage the lips 822 along the edges 820 of the channel 806 of the frame rail 100. Thereafter, the metal extends further so as to form a module support surface 2312 adjacent to each end of the central body portion 2302. The module support surfaces 2312 are generally co-planar, one relative to the other. The mounting clip 2300 has a plane of symmetry (not shown) that is located mid-way between the support surfaces 2312 and that bisects the opening 2304 and threaded nut 2306.

Figure 24:
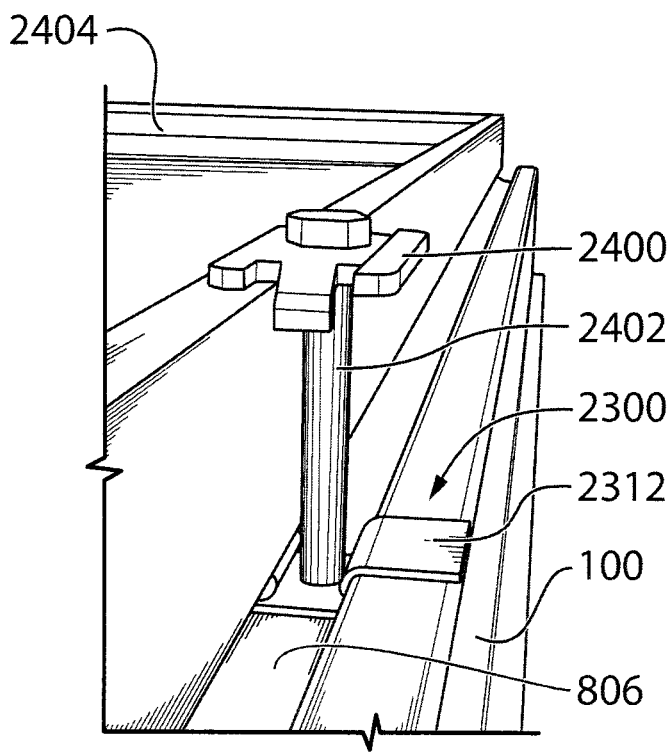
FIG. 24 is a perspective view showing a PV module secured to a frame rail using the mounting clip of FIG. 23.
Figure 25:
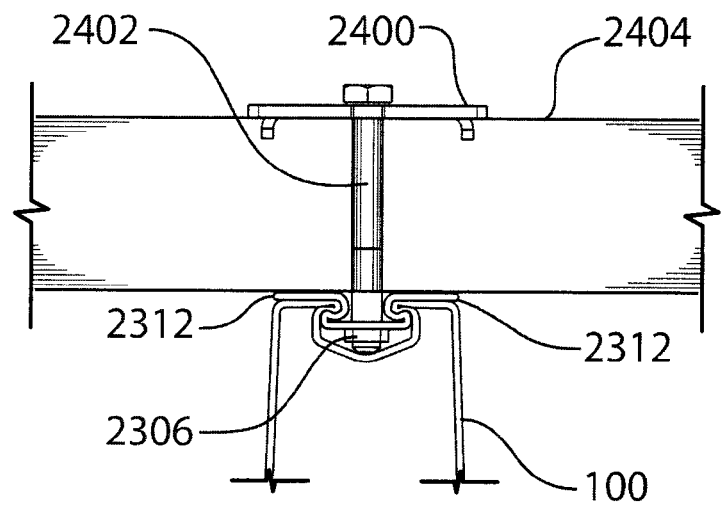
FIG. 25 is a side view showing a PV module secured to a frame rail using the mounting clip of FIG. 23.

FIG. 24 is a perspective view showing a mounting clip assembly including the mounting clip 2300 of FIG. 23 and a module clamp 2400 secured thereto via a fastener 2402 having a not illustrated engaging end, such as for instance a threaded end that engages the threaded nut 2306. Also shown in FIG. 24 is a PV module 2404, which is secured to a frame rail 100 via the mounting clip assembly. FIG. 25 is a side view showing the PV module 2400 secured to the frame rail 100 using the mounting clip assembly of FIG. 24. The mounting clip 2300 is inserted into the channel 806, such that the retaining surfaces 2310 of the mounting clip 2300 engage the lips 822 that extend along the flanges of the channel 806. The central body portion 2302 of the mounting clip 2300 is disposed within the channel 806 of the frame rail 100, and the module support surfaces 2312 extend out of the channel 806 so as to provide surfaces for receiving and supporting the PV module 2404. The PV module 2404 is held in place relative to the mounting clip 2300 using module clamp 2400, which is secured to the mounting clip 2300 using fastener 2402. The PV module 2402 is supported with a smaller spacing from the frame rail 100 compared to the spacing that occurs when one of the other mounting clips 1002, 1500 and 1900 is used. In this way, lower stresses are exerted on the mounting clip 2300 compared to the other mounting clips 1002, 1500 and 1900.

Figure 26:
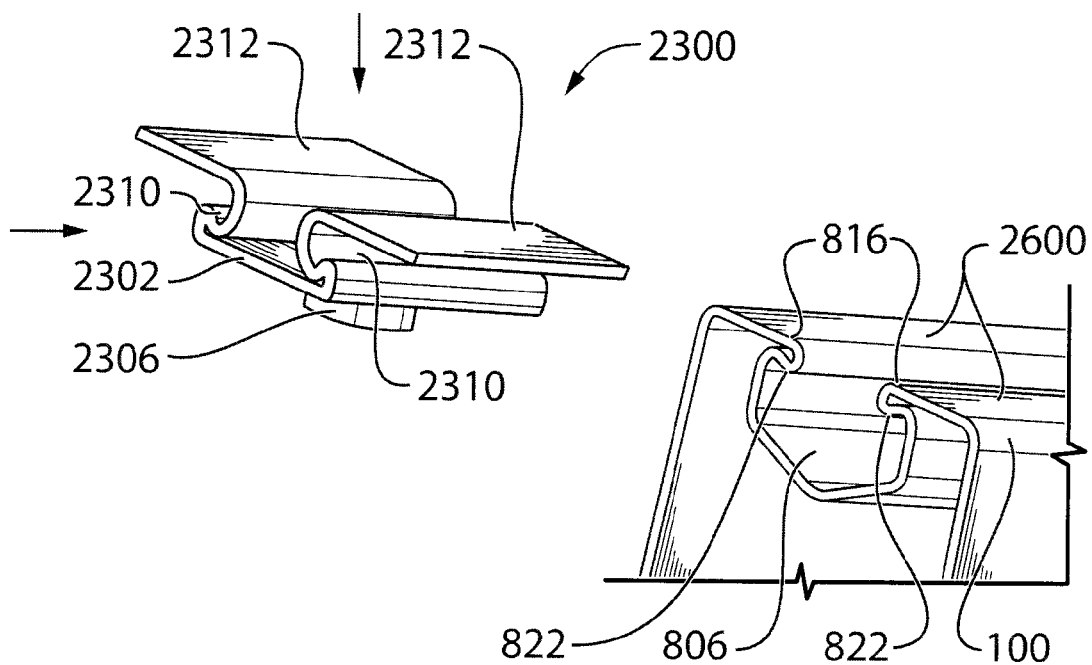
FIG. 26 is a perspective view showing the mounting clip of FIG. 23 aligned with the longitudinally extending channel of a frame rail, prior to being inserted into the longitudinally extending channel.
Figure 27:
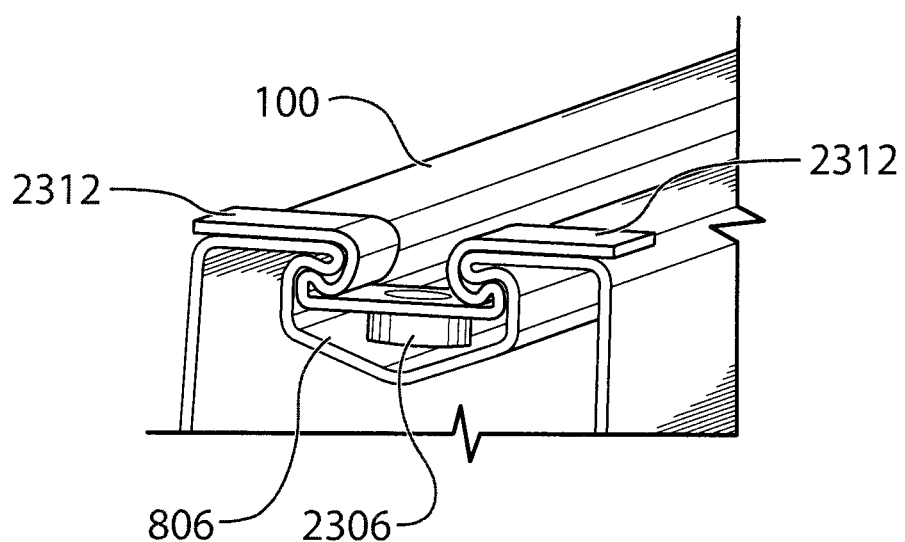
FIG. 27 is a perspective view showing the mounting clip of FIG. 23 after insertion into the longitudinally extending channel of the frame rail.

The mounting clip 2300 is inserted into the channel 806 along the longitudinal direction of the frame rail 100, which is in contrast to the way in which each of the mounting clips 1002, 1500 and 1900 is inserted. As is shown in FIGS. 26 and 27, the mounting clip 2300 is aligned with one end of the channel 806, and then it is inserted along the longitudinal direction of the channel 806. In particular, each retaining surface 2310 is aligned with the lip 822 along one of the flanges 816, such that the threaded nut 2306 is accommodated within the generally V-shaped base of the channel 806 and the support surfaces 2312 overlap the surface portions 2600 of the frame rail 100 flanking the channel 806. The shape of the mounting clip 2300, and in particular the retaining surface 2310 that engage the lips 822 along the retaining surface 818, prevents the mounting clip 2300 from being easily removed from the channel 806.

In the preceding sections, various elements of a PV module installation system have been described in detail. FIGS. 1-5 show a specific example in which frame rail 100 is secured to a roof-mount element 200 using mounting clamp 104. Alternatively, the frame rail 900 or the frame rail 950, or even another suitable frame rail, is mounted to the roof-mount element 200 in a similar fashion. Further alternatively, the mounting clamp 104 is used to secure the frame rail 100, 900 or 950, or another suitable frame rail, to a mounting element of a ground-based support structure. In that case, the mounting element of the ground-based support structure includes a slot similar to slot 206 for retaining the mounting clamp 104. In practice, the opposite ends of each frame rail are secured to a roof-mount element 200 or a mounting element of a ground-based support structure. Optionally, additional points of support are provided along the length of the frame rail. In each case, a mounting clamp 104 is used to secure the frame rail to the support element. As noted above, the ability to slide the retaining members 600a and 600b of the mounting clamp 104 within the slot 206, as well as the ability to slide the frame rail longitudinally prior to tightening the mounting clamp 104, supports adjustability in two directions. For instance, the roof-mount elements 200 may be secured in place relatively quickly without the need to ensure precise placement, and then the frame rail ends may be adjusted in the two directions as necessary in order to line up with the roof-mount elements 200.

In the specific and non-limiting examples that are described above, the frame rails 100 and 900 each have a closed profile that is formed from a sheet metal blank, in which opposite edges of the sheet metal blank are joined together along a seam without welding. In the examples that are shown in FIGS. 8a and 9a, the seams are formed within a central portion of the base surface of the frame rail. More particularly, each of the opposite edges of the sheet metal blank is hemmed, and the hemmed edges are joined together to form a grooved-seam. By forming a grooved-seam, the edges of the sheet metal blank are prevented from moving apart even without welding, riveting etc. along the seam. Alternatively, the seams are formed at another suitable location of the profile.

The mounting clips 1002, 1500, 1900 and 2300, as described in the previous sections, are resilient members that are formed from a metallic material having a thickness that is sufficient to result in spring properties. The mounting clips 1002, 1500, 1900 and 2300 are shown in the drawings, by way of a specific and non-limiting example, with shaped features that are adapted for being retained within the channel 806 of the frame rail 100. For instance, the clips 1002, 1500 and 1900 each have segments along the pendent legs thereof that are formed to engage the lip 822 near the edge 820 of the retaining surface 818. Further, the clips 1002, 1500 and 1900 each have segments along the pendent legs thereof that are formed to engage the V-shaped base 812 of the channel 806. Clearly, differently shaped clips are required for use with the frame rail 900, including a segment that is shaped to engage the generally flat base 914 of the channel 906. Similarly, differently shaped clips are required for use with the frame rail 950, since there are no lips proximate the edges 972 of the retaining surfaces 920 along the channel 954.

While the above description constitutes a plurality of embodiments of the present invention, it will be appreciated that the present invention is susceptible to further modification and change without departing from the fair meaning of the accompanying claims.

What is claimed is:

1. A clamp system for securing a frame rail of a photovoltaic (PV) module support structure, comprising:
    a mounting element having a frame rail support portion and having a slot defined within a surface of the frame rail support portion;
    an elongated member having a generally cylindrical body extending along a longitudinal axis between first and second opposite ends thereof, the elongated member having a head at the first end and having a threaded portion at the second end; and
    first and second retaining members each having a frame rail engaging end and a fastening end, each fastening end including a first portion defining a first opening and a second portion defining a second opening, the second opening being elongated relative to the first opening;
    wherein, in an assembled condition, the first portions of the fastening ends are parallel to one another, and the second portions of the fastening ends are inclined toward one another;
    wherein, in the assembled condition, the first and second retaining members extend through the slot of the mounting element such that the respective frame rail engaging ends are disposed on one side of the frame rail support portion and the respective fastening ends are disposed on the other side of the frame rail support portion, the frame rail engaging ends being spaced-apart and facing one another for receiving therebetween a base portion of a frame rail, the elongated member extending through the first and second openings defined within the fastening end of each of the first and second retaining members, the head of the elongated member engaging the first retaining member and the threaded portion of the elongated member threadedly engaging the second retaining member, such that a rotational movement of the elongated member about the longitudinal axis thereof is converted into a linear movement of the second retaining member relative to the first retaining member.

2. The clamp system according to claim 1 wherein the second retaining member comprises an integrated threaded nut for receiving the threaded portion of the elongated member.

3. The clamp system according to claim 1 wherein the frame rail engaging ends of the first and second retaining members are angled one toward the other when in the assembled condition.

4. The clamp system according to claim 1 wherein the mounting element comprises a roof-engaging end for securing the mounting element to the roof of a structure.

5. The clamp system according to claim 1 wherein the mounting element is part of a ground-based support structure.

6. The clamp system according to claim 1 wherein a length of the elongated member supports forming a space between the first and second retaining members that exceeds a width as measured at a base surface of the frame rail.

7. The clamp system according to claim 1 wherein the fastening end of each of the first and second retaining members is generally V-shaped.

8. The clamp system according to claim 1 comprising a slot-engaging portion joining the frame rail engaging end and the fastening end of each of the first and second retaining members, the slot-engaging portion narrower than either the frame rail engaging end or the fastening end, the slot-engaging portion received within the slot when the clamp system is in an assembled condition.

9. A method of securing a frame rail of a photovoltaic (PV) module support structure, comprising:
provihding a mounting element having a frame rail support portion and having a slot defined within a surface of the frame rail support portion;
arranging first and second retaining members within the slot of the mounting element such that a frame rail engaging end of each one of the first and second retaining members is disposed on one side of the frame rail support portion and a fastening end of each one of the first and second retaining members is disposed on the other side of the frame rail support portion, each fastening end including a first portion defining a first opening and a second portion defining a second opening, the second opening being elongated relative to the first opening, and wherein, in an assembled condition, the first portions of the fastening ends are parallel to one another, and the second portions of the fastening ends are inclined toward one another;
inserting an elongated member through the first and second openings defined within the fastening end of each of the first and second retaining members, such that a head of the elongated member engages the fastening and of first retaining member and a threaded portion of the elongated member threadedly engages a threaded surface of the fastening end of the second retaining member;
positioning a base surface of a frame rail adjacent to the frame rail support portion of the mounting element and between the frame rail engaging ends of the first and second retaining members; and
rotating the elongated member about a longitudinal axis thereof such that the threaded portion of the elongated member advances along the threaded surface of the fastening end of the second retaining member, thereby relatively moving the first retaining member in a direction toward the second retaining member so as to clamp the base surface of the frame rail between the respective frame rail engaging ends.

10. The method according to claim 9 comprising securing a roof-engaging end of the mounting element to a roof of a structure.

11. The method according to claim 9 comprising securing a PV module adjacent to a face of the frame rail that is opposite the base surface.

12. The method according to claim 9, wherein the frame rail engaging end of each one of the first and second retaining members engages an angled side-wall of the base portion of the frame rail.

13. A system for supporting a photovoltaic (PV) module, comprising:
a frame rail having a face that is formed so as to define a longitudinally extending channel, and the frame rail having a base surface that is opposite the face, a width of the base surface being greater than a width of the face;
a mounting element having a frame rail support portion and having a slot defined within a surface of the frame rail support portion;
an elongated member having a generally cylindrical body extending along a longitudinal axis between first and second opposite ends thereof, the elongated member having a head at the first end and having a threaded portion at the second end; and
first and second retaining members each having a frame rail engaging end and a fastening end, each fastening end including a first portion defining a first opening and a second portion defining a second opening, the second opening being elongated relative to the first opening;
wherein, in an assembled condition, the first portions of the fastening ends are parallel to one another, and the second portions of the fastening ends are inclined toward one another;
wherein, in the assembled condition, the first and second retaining members extend through the slot of the mounting element such that the respective frame rail engaging ends are disposed on one side of the frame rail support portion and the respective fastening ends are disposed on the other side of the frame rail support portion, the frame rail engaging ends being spaced-apart and facing one another for receiving therebetween the base of the frame rail, the elongated member extending through the first and second openings defined within the fastening end of each of the first and second retaining members, the head of the elongated member engaging the first retaining member and the threaded portion of the elongated member threadedly engaging the second retaining member, such that a rotational movement of the elongated member about the longitudinal axis thereof is converted into a linear movement of the second engaging member relative to the first engaging member.

14. The system according to claim 13 wherein the second retaining member comprises an integrated threaded nut for receiving the threaded portion of the elongated member.

15. The system according to claim 13 wherein the frame rail engaging ends of the first and second retaining members are angled one toward the other when in the assembled condition.

16. The system according to claim 13 wherein the mounting element comprises a roof-engaging end for securing the mounting element to the roof of a structure.

17. The system according to claim 13 wherein the mounting element is part of a ground-based support structure.

18. The system according to claim 13 wherein a length of the elongated member supports forming a space between the first and second retaining members that exceeds a width as measured at the base of the frame rail.

19. The system according to claim 13 wherein the fastening end of each of the first and second retaining members is generally V-shaped.

20. The system according to claim 13 comprising a slot-engaging portion joining the frame rail engaging end and the fastening end of each of the first and second retaining members, the slot-engaging portion narrower than either the frame rail engaging end or the fastening end, the slot-engaging portion received within the slot when the system is in an assembled condition.

21. A system for mounting a photovoltaic (PV) module, comprising:
a frame rail having a face including a longitudinally extending channel, a base surface, and opposite side-walls extending away from the base surface to the face;

each of the side walls including a first portion diverging from the first portion of the opposite side wall at a first rate and a second portion diverging from the second portion of the opposite side wall at a second rate, the second rate being greater than the first rate, the second portions of the side walls and the base surface presenting flange-like projections for engagement by frame rail engaging ends of a mounting clamp;

the face including flanges, each flange extending away from a respective one of opposite channel sidewalls, the metal that forms each one of the two flanges defining a retaining surface facing toward a base of the channel and being bent back upon itself thereby forming an edge along each one of the two flanges, the edge along each one of the two flanges joining a respective one of the retaining surfaces and the face, the retaining surface of each flange including a lip adjacent to the edge of the respective flange for engaging a mating surface of a mounting clip;

a fastener having an engaging end;

a module clamp carried at an end of the fastener that is opposite the engaging end; and a mounting clip having a support end and having a retaining end, the retaining end comprising a pair of pendent legs extending away from the support end, each one of the pair of pendent legs having a mating surface that is shaped for engaging the lip adjacent to the edge of one of the flanges of the frame rail, the support end having an opening defined therethrough for receiving the engaging end of the fastener;

wherein, in an assembled condition, the retaining end of the mounting clip is disposed within the longitudinally extending channel of the frame rail and the fastener interconnects the module clamp and the mounting clip, and wherein an edge portion of the PV module is retained between the support end of the mounting clip and the module clamp.

22. The system according to claim 21 wherein the mounting clip is a resilient member that is formed from a strip of sheet metal.

23. The system according to claim 22 wherein the metal forming the mounting clip extends between opposite ends of the support end and is bent back upon itself at each of the opposite ends, the bent back metal extending toward a central region of the mounting clip and thereafter being bent away from the support end so as to form the pair of pendent legs.

24. The system according to claim 23 wherein the PV module is seated directly onto the support end of the mounting clip when in a mounted condition.

25. The system according to claim 24, wherein the width of the supporting end of the mounting clip is substantially wider than the width of the retaining end of the mounting clip, such that the supporting end extends in a direction that is transverse to the longitudinal direction of the frame rail and beyond the opening of the channel at the face of the frame rail, thereby overlapping with the face of the frame rail and defining a support surface upon which the PV module is seated when in the mounted condition.

26. The system according to claim 21 wherein the metal forming the mounting clip extends between opposite ends of the support end and is bent away from the support end at each of the opposite ends so as to form the pair of pendent legs.

27. The system according to claim 26 comprising a second module clamp mounted at the engaging end of the fastener and adjacent to the support end of the mounting clip, wherein the PV module is seated on the second module clamp when in a mounted condition.

28. The system according to claim 21 wherein the support end of the mounting clip is disposed within the channel of the frame rail when the system is in an assembled condition, and wherein the metal forming the mounting clip extends out of the channel and defines the pair of pendent legs, the metal extending further to define module support surfaces along a portion of each one of the pair pendent legs.

29. The system according to claim 28 wherein a first pendent leg of the pair of pendent legs is disposed adjacent to one side of the channel and a second pendent leg of the pair of pendent legs is disposed adjacent to the other side of the channel.

30. The system according to claim 29 wherein the PV module is seated directly onto the module support surface of one of the pair of pendent legs when in a mounted condition.

31. The system according to claim 21 wherein the fastener is an elongated cylindrical member and wherein the engaging end of the fastener is a threaded end.

32. A method of mounting photovoltaic (PV) modules to a frame rail of a PV module support structure, comprising:

providing a frame rail having a face including a longitudinally extending channel, a base surface, and opposite sidewalls extending away from the base surface to the face;

each of the side walls including a first portion diverging from the first portion of the opposite side wall at a first rate and a second portion diverging from the second portion of the opposite side wall at a second rate, the second rate being greater than the first rate, the second portions of the side walls and the base surface presenting flange-like projections for engagement by frame rail engaging ends of a mounting clamp;

the face including flanges each extending away from a respective one of opposite channel sidewalls, the metal that forms each one of the two flanges defining a retaining surface facing toward a base of the channel and being bent back upon itself thereby forming an edge along each one of the two flanges, the edge along each one of the two flanges joining a respective one of the retaining surfaces and the face of the frame rail, the retaining surface of each flange including a lip adjacent to the edge of the respective flange, the lip being shaped for engaging a mating surface of a mounting clip;

providing a mounting clip comprising a support end and having a retaining end, the retaining end comprising a pair of pendent legs extending away from the support end, each one of the pair of pendent legs having a mating surface that is shaped for engaging the lip adjacent to the edge of one of the flanges of the frame rail, the support end having an opening defined therethrough for receiving a threaded end of a fastener;

aligning the pendent legs of the mounting clip with the channel of the frame rail and applying a force so as to insert the pendent legs into the channel such that the mating surface of each of the pendent legs engages the lip of a respective one of the flanges; and using a fastener, securing an edge portion of the PV module to the mounting clip, comprising securing an engaging end of the fastener within the opening of the support end of the mounting clip and thereafter turning the fastener in a securing direction so as to clamp down the edge portion of the PV module.

33. The method according to claim 32 wherein the mounting clip is inserted along a direction that is perpendicular to the longitudinal direction of the channel.

34. The method according to claim 33 wherein the pendent legs of the pair of pendent legs are deflected one toward the other during inserting the mounting clip into the channel.

35. The method according to claim 32 wherein the mounting clip is inserted along a direction that is parallel to the longitudinal direction of the channel.

36. The method according to claim 32 wherein the engaging end of the fastener is a threaded end and the opening of the support end is a threaded opening, and wherein securing the engaging end of the fastener comprises threadedly advancing the threaded end of the fastener into the threaded opening of the support end.

\* \* \* \* \*